United States Patent
Faulkner

[19]

[11] Patent Number: 5,906,270
[45] Date of Patent: May 25, 1999

[54] TIGHT TURNING RADIUS CONVEYOR BELT

[76] Inventor: William G. Faulkner, 6701 Newman Dr., Oklahoma City, Okla. 73162

[21] Appl. No.: 08/699,884

[22] Filed: Aug. 16, 1996

[51] Int. Cl.$^6$ .................................................. B65G 17/06
[52] U.S. Cl. ............................................................. 198/853
[58] Field of Search ................................... 198/850, 851, 198/852, 853, 778, 841

[56] References Cited

U.S. PATENT DOCUMENTS

| | | | |
|---|---|---|---|
| 3,261,451 | 7/1966 | Roinestad | 198/193 |
| 3,854,575 | 12/1974 | Fraioli, Sr. | 198/853 X |
| 3,880,276 | 4/1975 | Willett, III | 198/853 X |
| 4,078,655 | 3/1978 | Roinestad | 198/848 |
| 4,222,483 | 9/1980 | Wootton et al. | 198/831 |
| 4,934,517 | 6/1990 | Lapeyre | 198/852 |
| 4,953,693 | 9/1990 | Draebel | 198/853 |
| 4,972,942 | 11/1990 | Faulkner | 198/853 |
| 5,139,135 | 8/1992 | Irwin et al. | 198/852 |
| 5,141,099 | 8/1992 | Baumgartner | 198/778 |
| 5,174,439 | 12/1992 | Spangler et al. | 198/853 |
| 5,271,491 | 12/1993 | Irwin | 198/778 |
| 5,372,248 | 12/1994 | Horton | 198/852 |
| 5,431,275 | 7/1995 | Faulkner | 198/853 |
| 5,573,105 | 11/1996 | Palmaer | 198/853 |
| 5,613,597 | 3/1997 | Palmaer et al. | 198/853 |
| 5,622,252 | 4/1997 | Raum | 198/852 X |
| 5,645,160 | 7/1997 | Palmaer et al. | 198/853 |

OTHER PUBLICATIONS

Ashworth Bros., Inc., Bulletin No. SR80 (Rev. 8/83), "An Introduction to Small Radium, Omniflex® and Small Radius Omni–Grid®".
Rexnord Corp., Bulletin No. 8002, ©1990, TableTop® and MatTop® chain selection guide.

*Primary Examiner*—James R. Bidwell
*Attorney, Agent, or Firm*—Dunlap, Codding & Rogers, P.C.

[57] ABSTRACT

The present invention relates to a conveyor belt having a plurality of link assemblies. Each of the link assemblies has a forward end, a rearward end, a first side and a second side. A forward shaft opening extends through the forward end of each link assembly and a rearward shaft opening extends through the rearward end of each link assembly. A plurality of link shafts are provided for interconnecting adjacently disposed link assemblies such that the link assemblies are laterally movable relative to adjacently disposed link assemblies. One of the link shafts extends through the forward shaft opening of each of the link assemblies and through the rearward shaft openings of an adjacently disposed link assembly. Each link shaft has a first end disposed inwardly a distance from the first side of each of the link assemblies, and a second end disposed inwardly a distance from the second side of each of the link assemblies such that in an assembled position the second end of the conveyor belt is fixed laterally with respect to the first end of the conveyor belt. The link assemblies are constructed to permit the conveyor belt to turn bi-directionally with a turning ratio of less than 1.0 in each direction.

88 Claims, 9 Drawing Sheets

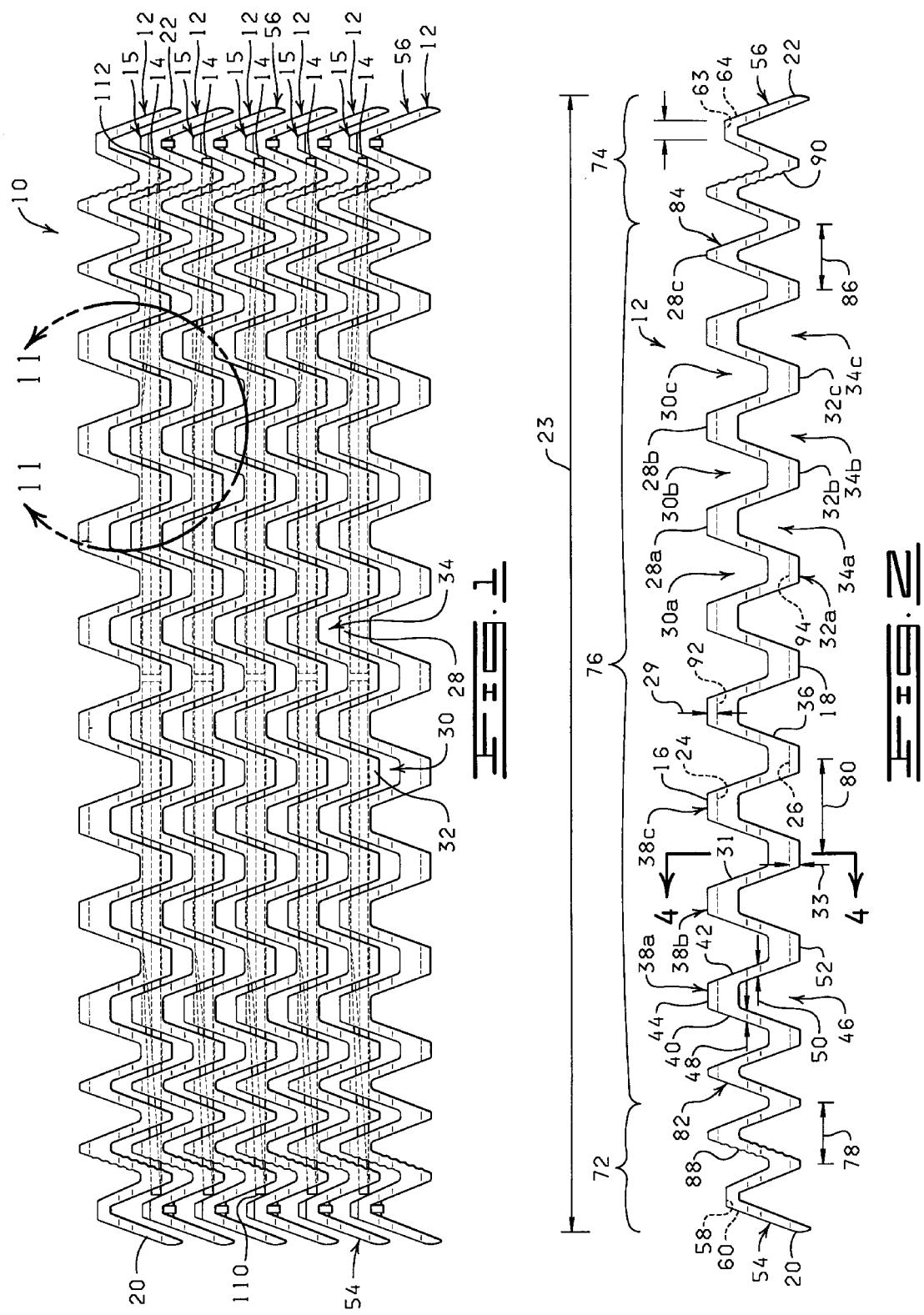

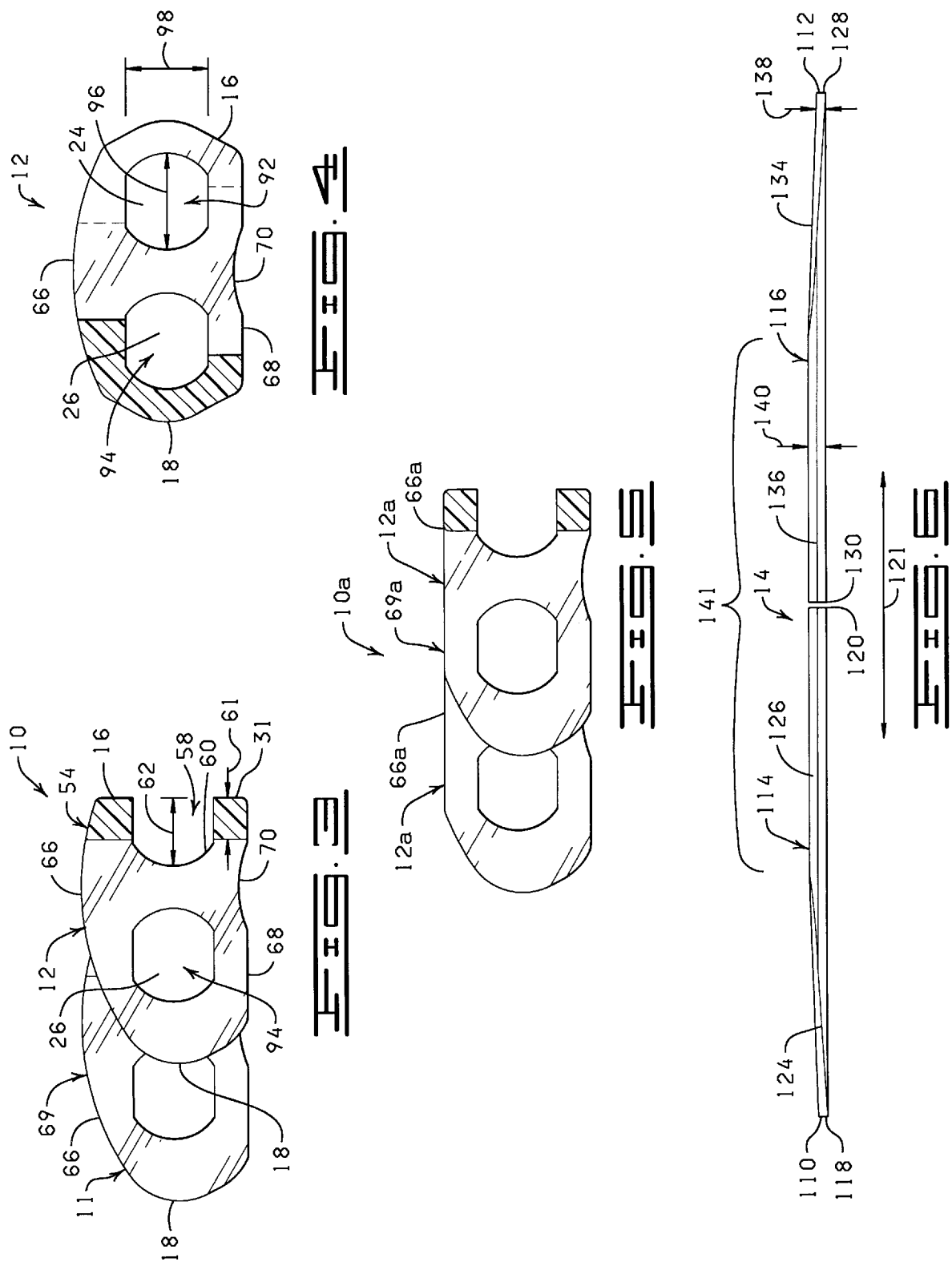

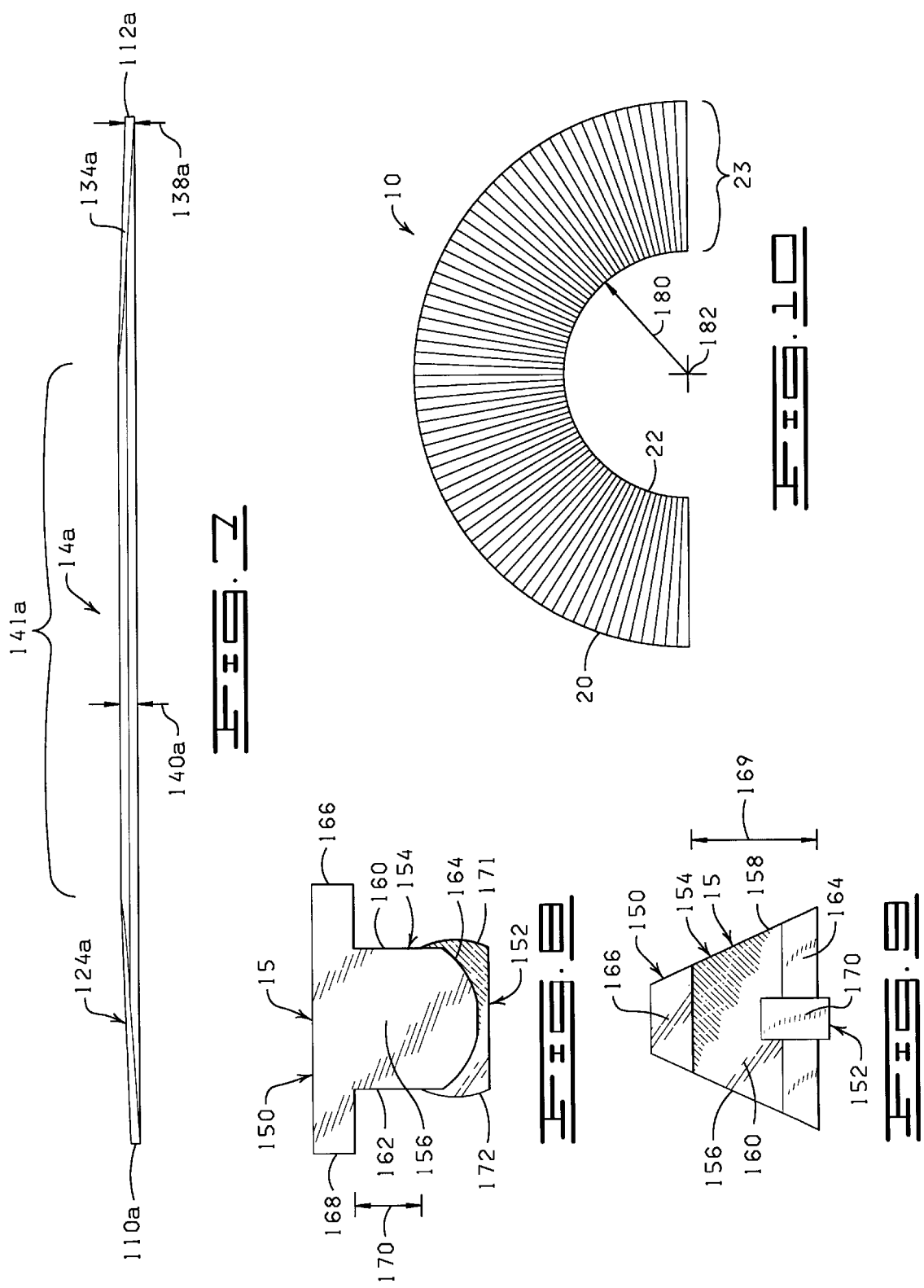

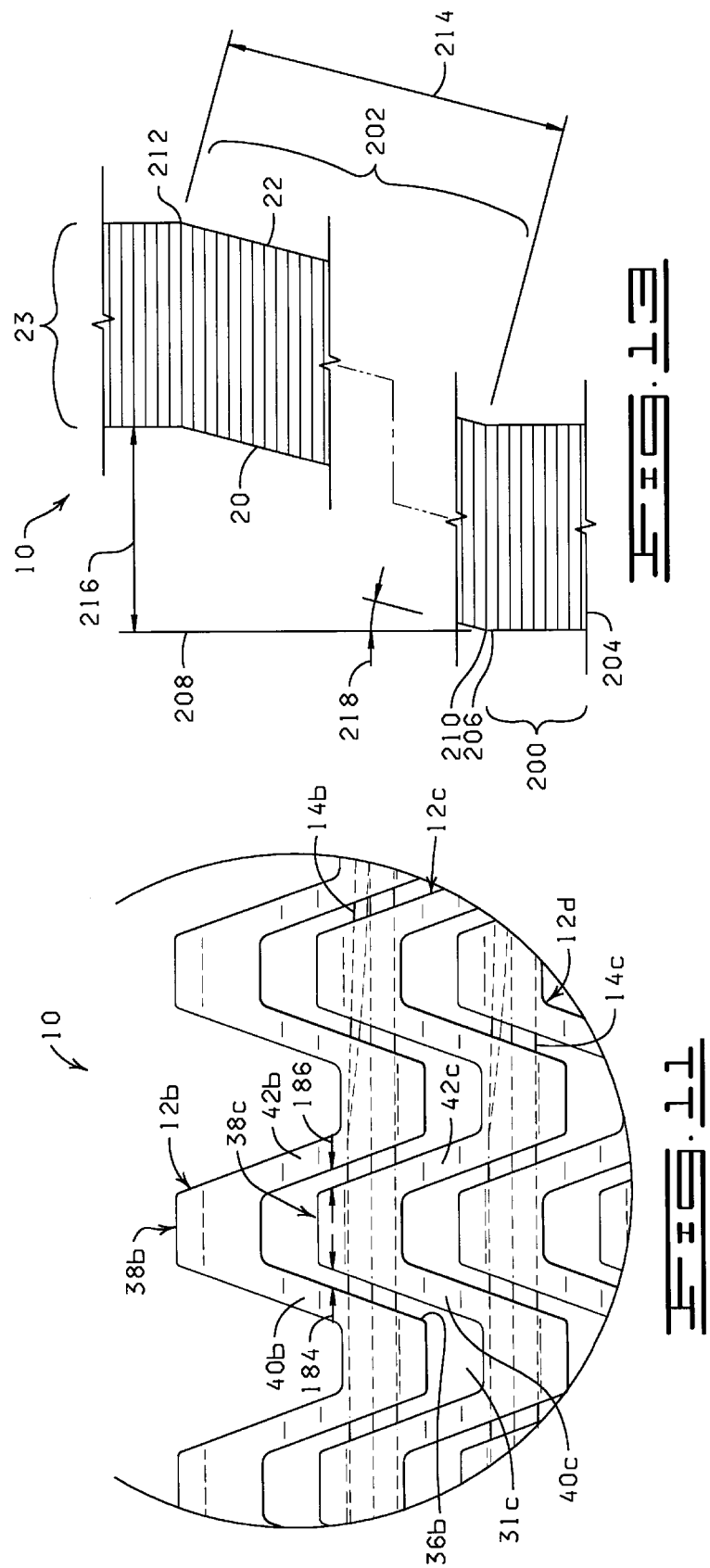

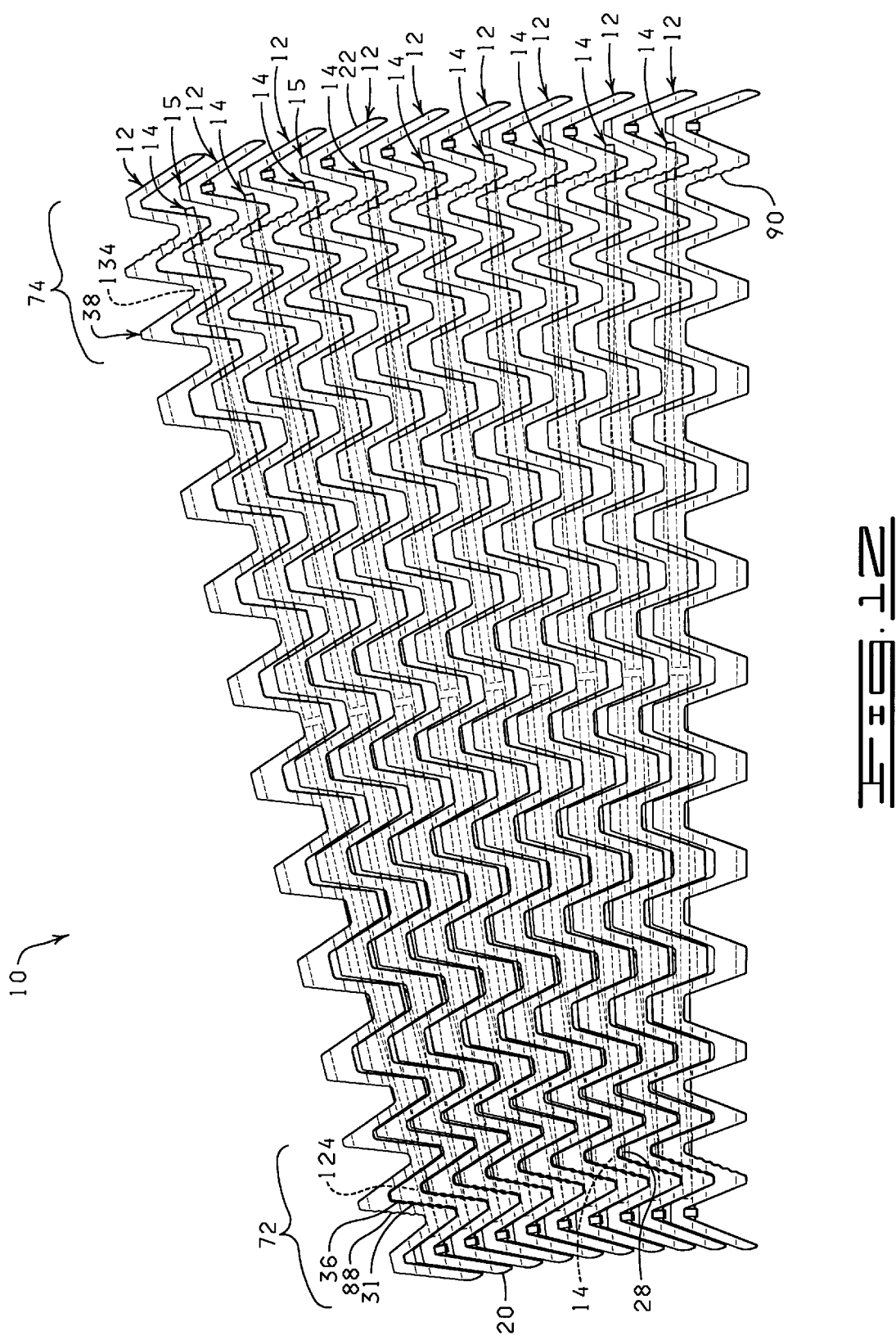

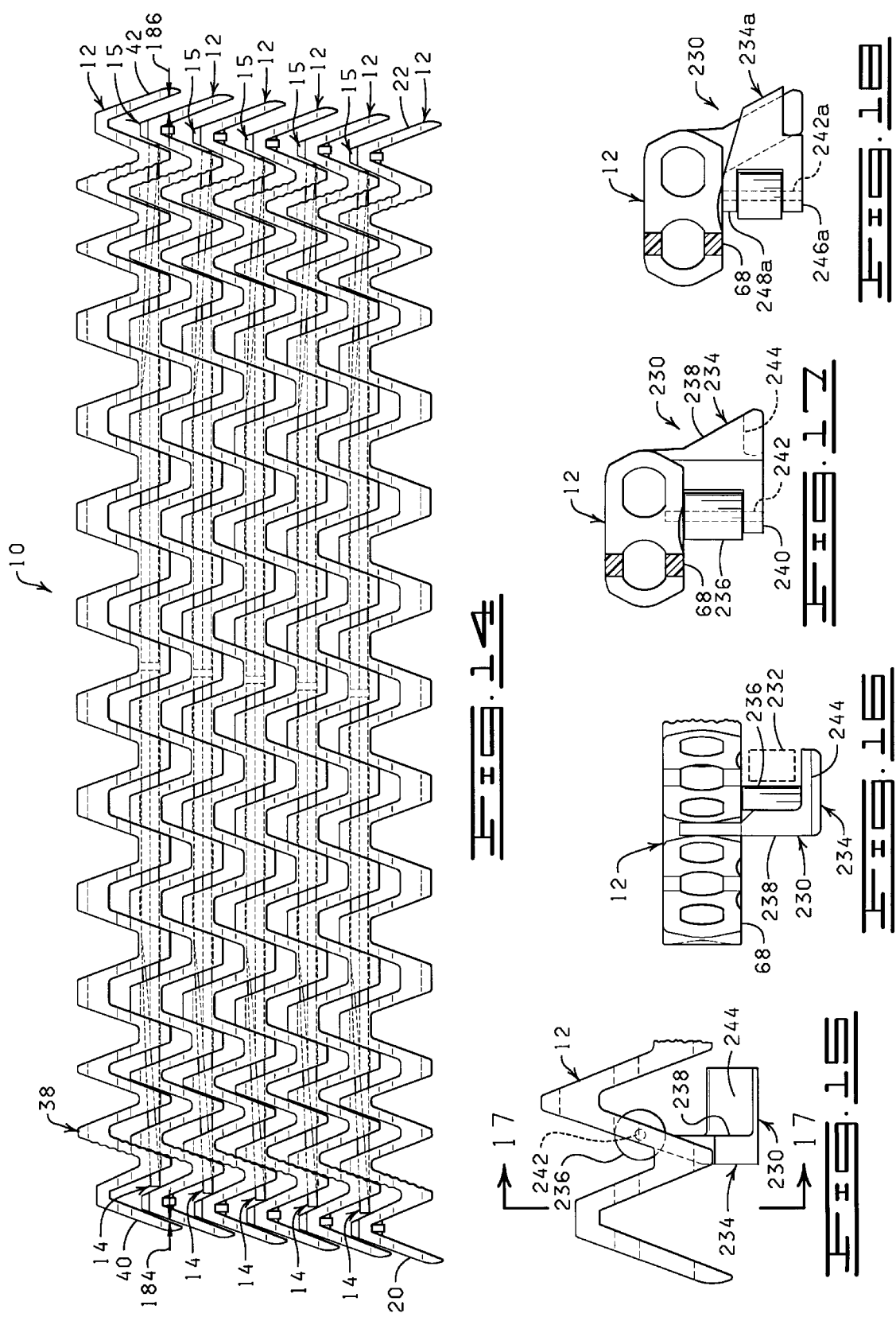

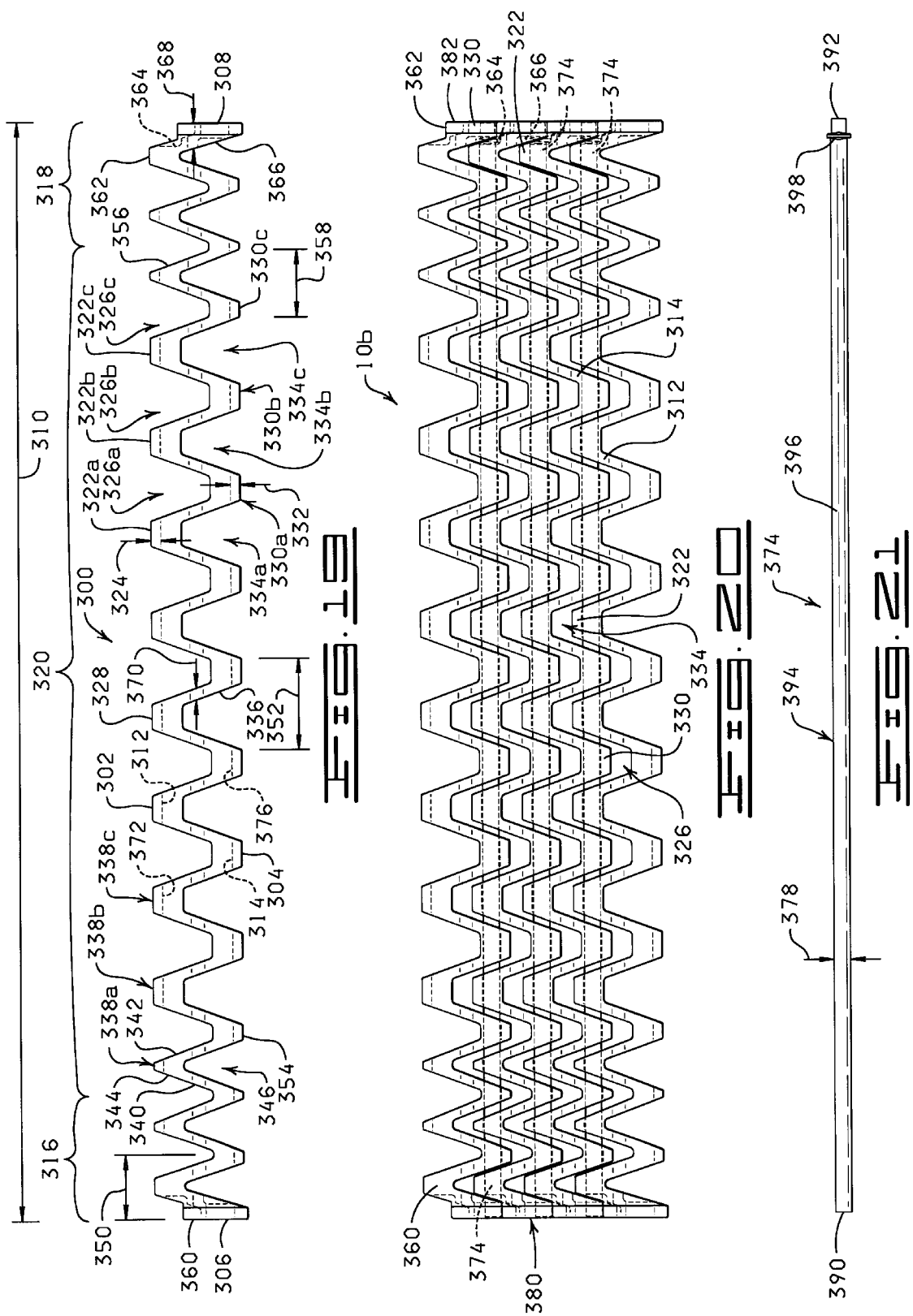

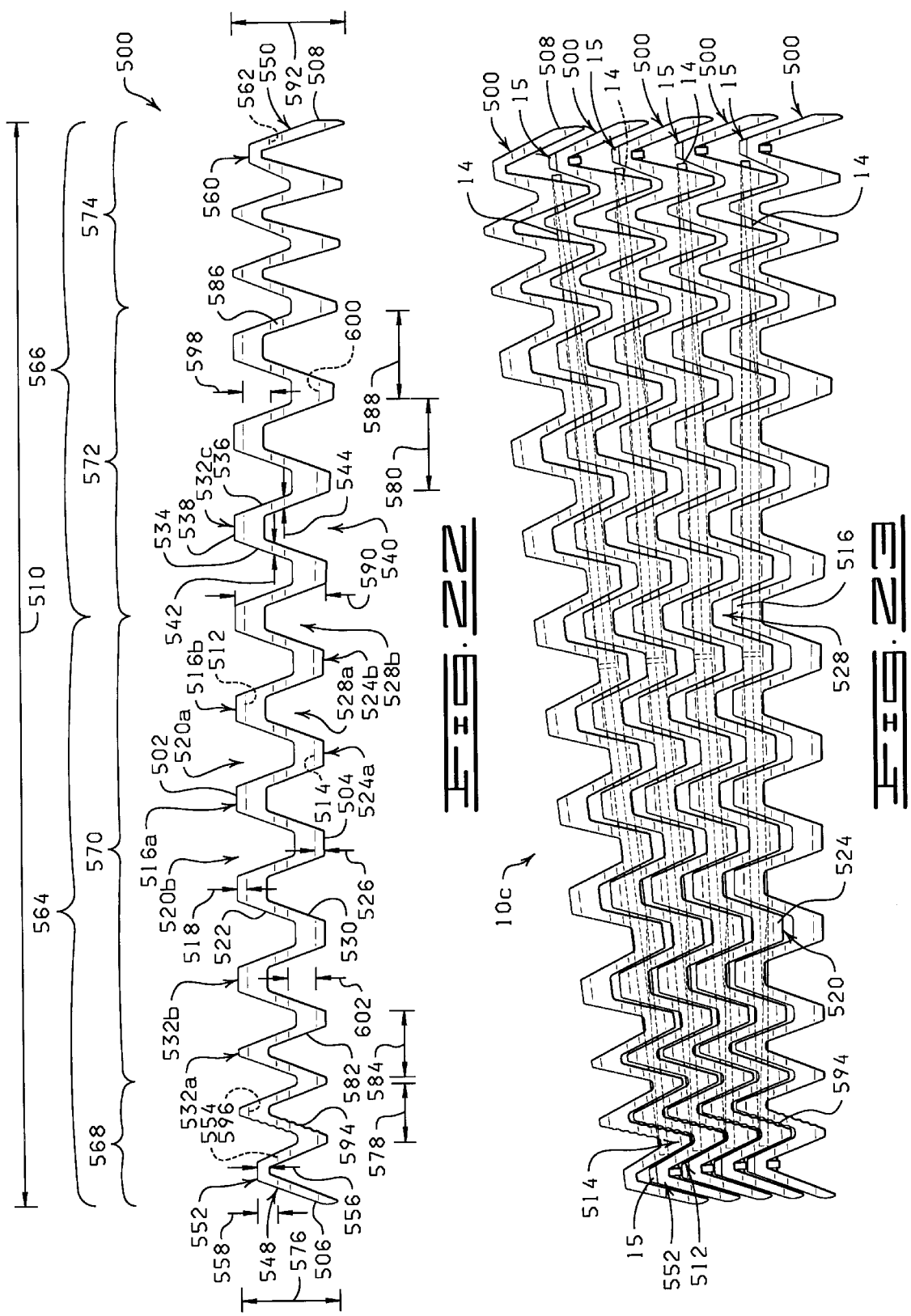

TIGHT TURNING RADIUS CONVEYOR BELT

BACKGROUND OF THE INVENTION

1. Field of the Invention.

The present invention relates generally to devices and methods for conveying articles, and more particularly, but not by way of limitation to an improved conveyor belt having an object discharging end thereof laterally displaceable from an object receiving end.

2. Brief Description of the Prior Art.

There are many instances when it is desirable for a conveyor belt to travel on either a radial path or an angularly disposed path so that the object discharging end of the conveyor belt is laterally displaced relative to the object receiving end of the conveyor belt. Various problems occur when a conveyor belt travels on a radial path which limit the size of the radius on which a given conveyor belt can be turned. One problem for example with prior art conveyor belts has been that the load placed on the plurality of links which make up the conveyor belt is transferred to the conveyor belt's outer most link as the conveyor belt travels on a radial path. This often leads to the breakage of the outer most link.

To permit conveyor belts to travel on a radial path, the holes in the link assemblies where the link shafts extend through have been elongated or enlarged to accommodate the compression or expansion of the link assemblies as the conveyor belt travels on a radial path. There is a limit of course to how large a hole can be made or elongated to accommodate this expansion or compression of the link assemblies.

The present conveyor belt is provided with a unique link assembly whereby a given size of conveyor belt can turn on a smaller radius as compared to prior art spiral type conveyor belts, while also permitting the object discharging end of the conveyor belt to be laterally displaced relative to the object receiving end without turning the conveyor belt.

BRIEF DESCRIPTION OF THE DRAWINGS

FIG. 1 is a plan view of a portion of a conveyor belt constructed in accordance with the present invention, the portion of the conveyor belt including only six link assemblies interconnected by five link shafts.

FIG. 2 is a plan view of a typical link assembly.

Figure 24:
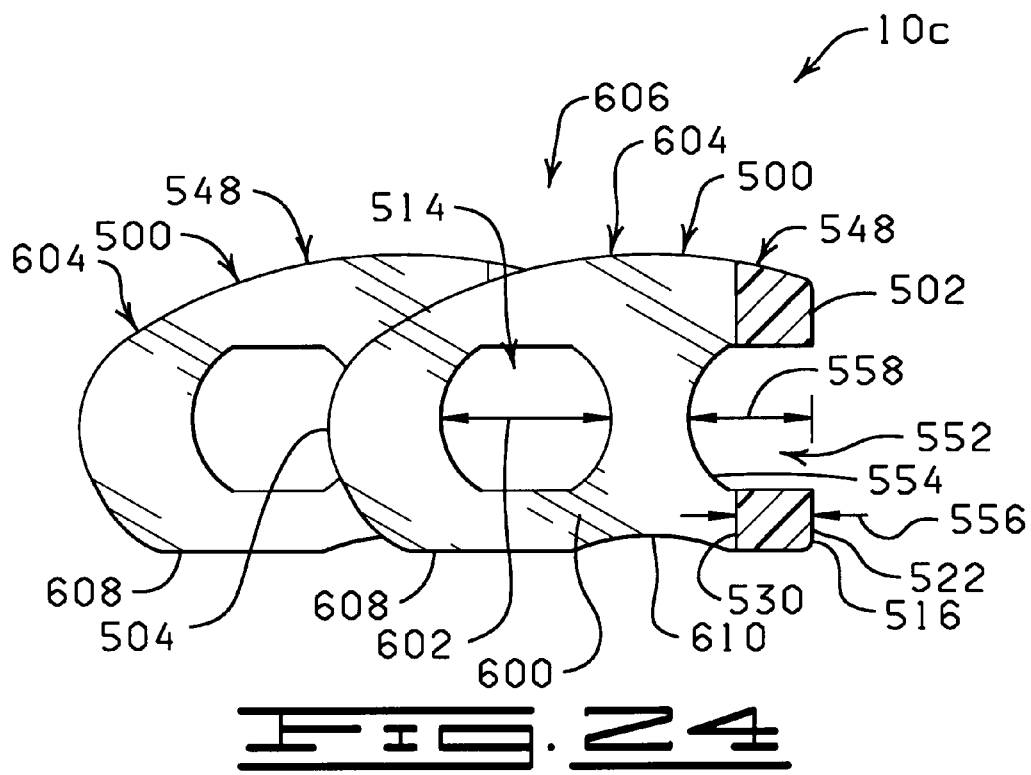

Shown in FIG. 3 is a side view of two adjacently disposed links to illustrate a top surface of the conveyor belt formed from the two adjacently disposed links having a scalloped configuration.

FIG. 4 is a cross sectional view of a link in the medial portion of the link assembly, taken substantially along the lines 4—4 of FIG. 2.

Shown in FIG. 5 is a side view of two adjacently disposed links of a second embodiment of the present invention to illustrate a top surface of the conveyor belt formed from the two adjacently disposed links having a substantially planar configuration.

FIG. 6 is a plan view of a link shaft constructed in accordance with the present invention.

FIG. 7 is a plan view of a second embodiment of a link shaft of the conveyor belt constructed in accordance with the present invention.

FIG. 8 is a side elevational view of a cap member of the conveyor belt constructed in accordance with the present invention.

FIG. 9 is a front elevational view of the cap member of FIG. 8.

FIG. 10 is a diagrammatic, plan view of a portion of the conveyor belt constructed in accordance with the present invention travelling on a radial path.

FIG. 11 is a plan view of a portion of the conveyor belt of FIG. 1, taken substantially along the lines 11—11 of FIG. 1.

FIG. 12 is a plan view of a portion of the conveyor belt constructed in accordance with the present invention showing the disposition of the link assemblies when the conveyor belt is travelling on a radial path.

FIG. 13 is a diagrammatic, plan view of a section of the conveyor belt constructed in accordance with the present invention wherein a first portion of the conveyor belt is disposed so as to travel along a substantially straight path and a second portion of the conveyor belt is disposed so as to travel along an angularly disposed path.

FIG. 14 is a plan view of a section of the conveyor belt wherein the segment is angularly disposed so that it travels along an angularly disposed path.

FIG. 15 is a fragmental, plan view of one end portion of a link assembly of the conveyor belt constructed in accordance with the present invention.

FIG. 16 is a fragmental, front elevational view of the end portion of the link assembly of FIG. 15.

FIG. 17 is a side elevational view of the end portion of the link assembly of FIG. 15.

FIG. 18 is a side elevational view of one end portion of another embodiment of a link assembly of the conveyor belt constructed in accordance with the present invention.

FIG. 19 is a plan view of another embodiment of a link assembly of the conveyor belt constructed in accordance with the present invention.

FIG. 20 is a plan view of a portion of a conveyor belt constructed in accordance with the present invention, the portion of the conveyor belt including only four interconnected link assemblies of FIG. 19.

FIG. 21 is a plan view of a link shaft for interconnecting adjacently disposed link assemblies of the conveyor belt constructed in accordance with the present invention.

FIG. 22 is a plan view of another embodiment of a link assembly of a conveyor belt constructed in accordance with the present invention.

FIG. 23 is a plan view of a portion of a conveyor belt constructed in accordance with the present invention, the portion of the conveyor belt including only five link assemblies of FIG. 22 interconnected by four link shafts of FIG. 6.

FIG. 24 is a cross-sectional view of a segment of the conveyor belt of FIG. 23 which is formed from two adjacently disposed link assemblies of FIG. 22.

Figure 25:
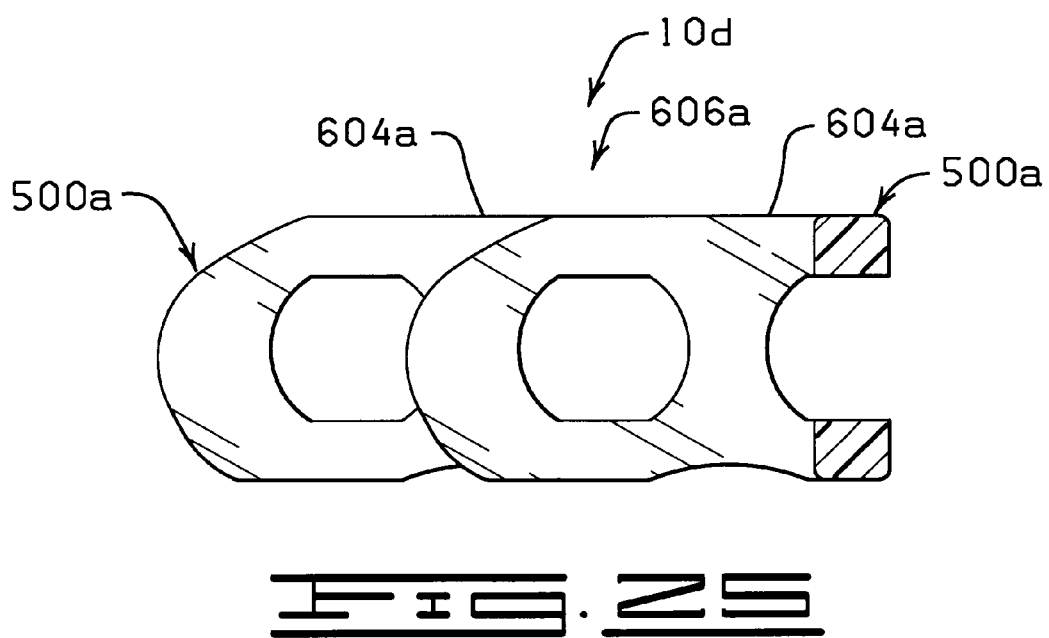

FIG. 25 is a side view of a segment of a conveyor belt which is constructed in accordance with the present invention.

DETAILED DESCRIPTION

Referring now to the drawings, designated therein by the general reference numeral 10 (FIGS. 1, 10, 11, 12, 13 and 14) is a portion of a conveyor belt which is constructed in accordance with the present invention. The conveyor belt 10 comprises a plurality of link assemblies 12 (FIGS. 1, 2, 3, 4, 11, 12 and 14) interconnected with a plurality of link shafts 14 (FIGS. 1, 6, 11, 13 and 14) which are maintained within the link assemblies 12 by a plurality of cap members 15 (FIGS. 1, 8, 9, 12, 14 and 23). It is to be understood that the conveyor belt 10 comprises a large number of the link assemblies 12 which are interconnected via the link shafts 14 and the conveyor belt 10 is generally extended about sprockets and used for conveying objects in a manner well known in the art.

Each of the link assemblies 12 of the conveyor belt 10 is substantially identical in construction. Thus, only one of the link assemblies 12 will be described in detail hereinafter with reference to FIG. 2. The link assembly 12 has a forward end 16 (FIGS. 2, 3 and 4), a rearward end 18 (FIGS. 2, 3 and 4), a first side 20 (FIGS. 1, 2, 10, 12, 13 and 14), a second side 22 (FIGS. 1, 2, 10, 12, 13 and 14) and a width 23 (FIGS. 2, 10 and 13) extending generally between the first side 20 and the second side 22. A forward shaft opening 24 (FIGS. 2 and 4) extends through the forward end 16 of each link assembly 12 and a rearward shaft opening 26 (FIGS. 2, 3 and 4) extends through the rearward end 18 of each link assembly 12.

A plurality of forward link ends 28 (FIGS. 1 and 2) are spaced across the forward end 16 of the link assembly 12. Only three forward link ends 28 are designated in FIG. 2 by the references numerals 28a, 28b, 28c. The forward link ends 28 are provided with a thickness 29 (FIG. 2) extending generally between the forward end 16 and the forward shaft opening 24. The forward link ends 28 define a plurality of forward link spaces 30 (FIGS. 1 and 2) therebetween such that the link assembly 12 has a forward surface 31 (FIG. 2) forming a contiguous row of alternating forward link ends 28 and forward link spaces 30. Only three forward link spaces 30 are designated in FIG. 2 by the references numerals 30a, 30b and 30c.

A plurality of rearward link ends 32 (FIGS. 1 and 2) are spaced across the rearward end 18 of the link assembly 12. Only three rearward link ends 32 are designated in FIG. 2 by the references numerals 32a, 32b and 32c. The rearward link ends 32 are provided with a thickness 33 (FIG. 2) extending generally between the rearward end 18 and the rearward shaft opening 26. The rearward link ends 32 define a plurality of rearward link spaces 34 (FIGS. 1 and 2) therebetween such that the link assembly 12 has a rearward surface 36 (FIG. 2) forming a contiguous row of alternating rearward link ends 32 and rearward link spaces 34. Only three rearward link spaces 34 are designated in FIG. 2 by the reference numerals 34a, 34b and 34c.

The link assembly 12 is further provided with a plurality of links 38 (FIG. 2). Only three links 38 are designated in FIG. 2 by the reference numerals 38a, 38b and 38c. Each link 38 has a first side 40 (FIG. 2), a second side 42 (FIG. 2), a closed forward end 44 (FIG. 2) defining one of the forward link ends 28, and an open rearward end 46 (FIG. 2) defining one of the rearward link spaces 34. The first side 40 and the second side 42 of each link 38 extend generally between the forward end 44 and the rearward end 46 of each link 38. Each of the first sides 40 are provided with a substantially uniform thickness 48 (FIG. 2) and each of the second sides 42 are provided with a substantially uniform thickness 50 (FIG. 2). The thickness 48 of the first side 40 is substantially equal to the thickness 50 of the second side 42.

The link assembly 12 includes a plurality of connecting members 52 (FIG. 2) with each connecting member 52 connecting the second side 42 of each link 38 in the link assembly 12 to the first side 40 of an adjacently disposed link 38 to form a row of interconnected links 38 in the link assembly 12. The forward ends 44 of each link 38 cooperate to form the forward end 16 of the link assembly 12 and the rearward ends 46 of each link 38 cooperate to form the rearward end 18 of the link assembly 12. The connecting members 52 form the rearward link ends 32 of the link assembly 12.

One of the links 38 is disposed adjacent the first side 20 of the link assembly 12 for forming a first end link 54 (FIGS. 1, 2 and 3) and one of the links 38 is disposed adjacent the second side 22 of the link assembly 12 for forming a second end link 56 (FIGS. 1 and 2). The first side 40 of the first end link 54 forms the first side 20 of the link assembly 12 and the second side 42 of the second end link 56 forms the second side 22 of the link assembly 12.

The link assembly 12 is provided with a first opening 58 (FIGS. 2 and 3) extending through the forward link end 28 of the first end link 54 between the forward end 44 and rearward end 46 thereof for defining a first link shaft end receiving surface 60 (FIGS. 2 and 3). The first end link 54 has a thickness 61 (FIG. 3) extending between the forward surface 31 and the rearward surface 36 of the link assembly 12. A distance 62 extends between the first link shaft end receiving surface 60 and the forward surface 62 of the first end link 54. One of the cap members 15 is disposed in the first opening 58 for closing the forward shaft opening 24 of the link assembly 12 and for closing the rearward shaft opening 26 of an adjacently disposed link assembly 12 so as to maintain the link shafts 14 in the link assemblies 12. The link assembly 12 is further provided with a second opening 63 (FIG. 2) extending through the forward link end 28 of the second end link 56 between the forward end 44 and the rearward end 46 thereof for defining a second link shaft end receiving surface 64 (FIGS. 2). One of the cap members 15 is disposed in the second opening 63 for closing the forward shaft opening 24 of the link assembly 12 and for closing the rearward shaft opening 26 of an adjacently disposed link assembly 12 so as to maintain the link shafts 14 in the link assemblies 12.

The second opening 63 and the second link shaft end receiving surface 64 are substantially identical in construction to the first opening 58 and the first link shaft end receiving surface 60, respectively. Thus, only the first opening 58 and the first link shaft end receiving surface 60 are shown and described in detail herein.

The link assembly 12 has a top surface 66 (FIGS. 3 and 4) and a bottom surface 68 (FIGS. 3 and 4). The top surface 66 of the link assembly 12 cooperates with the top surfaces 66 of the other link assemblies 12 to provide the conveyor belt 10 with a top surface 69 (FIG. 3). The top surface 66 of the link assembly 12 has an arcuate configuration such that the top surface 69 of the conveyor belt 10 is provided with a scalloped configuration for preventing chordial chatter when the conveyor belt 10 is travelling around a dead top. The bottom surface 68 has an indention 70 (FIGS. 3 and 4) formed therein. The indention 70 extends generally between the first side 20 and the second side 22 of the link assembly 12.

The link assembly 12 is characterized as having a first end portion 72 (FIGS. 2 and 12), a second end portion 74 (FIGS. 2 and 12) and a medial portion 76 (FIG. 2). The first end portion 72 extends a predetermined distance from the first end 20 of the link assembly 12 towards the second end 22 of the link assembly 12. The medial portion 76 extends a predetermined distance from the first end portion 72 towards the second end 22 of the link assembly 12. The second end portion 74 extends a predetermined distance from the medial portion 76 to the second end 22 of the link assembly 12.

The links 38 in the first end portion 72 and in the second end portion 74 have a width 78 (FIG. 2) less than a width 80 (FIG. 2) of the links 38 in the medial portion 76. The medial portion 76 of the link assembly 12 has a first transitional link 82 (FIG. 2) disposed immediately adjacent the first end portion 72, and a second transitional link 84 (FIG. 2) disposed immediately adjacent the second end portion 74. The first and second transitional links 82 and 84, respectively, have a width 86 (FIG. 2) less than the width 80 of the remaining links 38 in the medial portion 76, but greater than the width 78 of the links 38 in the first and second end portions 72 and 74, respectively. Typically, the width 78 of the links 38 in the first and second end portions 72 and 74, respectively, is about ⅔ the width 80 of the links 38 in the medial portion 76.

A plurality of first end serrations 88 (FIGS. 2 and 12) are formed on a portion of the forward surface 31 and on a portion of the rearward surface 36 of the link assembly 12 in the first end portion 72 thereof. The first end serrations 88 of the link assembly 12 are configured to intermesh with the first end serrations 88 of an adjacently disposed link assembly 12 when the forward surface 31 of the one link assembly 12 is mated against the rearward surface 36 of the adjacently disposed link assembly 12, as shown in FIG. 12. In this position, the first end serrations 88 of the one link assembly 12 engage the first end serrations 88 of the adjacently disposed link assembly 12 such that the adjacently disposed link assemblies 12 are locked together for preventing inboard friction or motion between the adjacently disposed link assemblies 12 when the adjacently disposed link assemblies 12 are travelling on a radial path or when the object discharging end of the conveyor belt 10 is laterally displaced relative to the object receiving end of the conveyor belt 10.

A plurality of second end serrations 90 (FIGS. 2 and 12) are formed on a portion of the forward surface 31 and on a portion of the rearward surface 36 of the link assembly 12 in the second end portion 74 thereof. The second end serrations 90 of the link assembly 12 are configured to intermesh with the second end serrations 90 of an adjacently disposed link assembly 12 when the forward surface 31 of the one link assembly 12 is mated against the rearward surface 36 of the adjacently disposed link assembly 12. In this position, the second end serrations 90 of the one link assembly 12 engage the second end serrations 90 of the adjacently disposed link assembly 12 such that the adjacently disposed link assemblies 12 are locked together for preventing inboard friction between the adjacently disposed link assemblies 12 when the adjacently disposed link assemblies 12 are travelling on a radial path, for example.

A first shaft opening 92 (FIGS. 2 and 4) is formed through the forward link ends 28 of the link assembly 12. The first shaft openings 92 are generally aligned and sized to receive one of the link shafts 14. The first shaft openings 92 cooperate to form the forward shaft opening 24 of the link assembly 12.

A second shaft opening 94 (FIGS. 2, 3 and 4) is formed through the rearward link ends 32 of the link assembly 12. The second shaft openings 94 are generally aligned and sized to receive one of the link shafts 14. The second shaft openings 94 cooperate to form the rearward shaft opening 26 of the link assembly 12. It should be noted that the first shaft opening 92 and the second shaft opening 94 are generally oblong shaped and have a length 96 (FIG. 4) and a width 98 (FIG. 4) greater than the diameter of the link shafts 14 to permit movement of the link shafts 14 in the first and second shaft openings 92 and 94, respectively, such that the link assemblies 12 are selectively movable in a longitudinal direction and a lateral direction relative to adjacently disposed link assemblies 12 for a purpose to be described hereinafter. The distance between the center of the first shaft opening 92 to the center of the second shaft opening 94 is typically about 0.567 inches.

Each of the link assemblies 12 is typically an integrally formed link assembly constructed of a plastic, ceramic or metal material and the first end portion 72, the second end portion 74 and the medial portion 76 are integrally constructed and connected. In some embodiments, the medial portion 76 may be formed from multiple interconnected or non-interconnected intermediate portions to form the link assembly 12. Alternately, or in addition, the first end portion 72 and the second end portion 74 may be separate elements interconnected or non-interconnected with the medial portion 76 to form the link assembly 12. Typically, the links 38 in the first and second end portions 72 and 74, respectively, are substantially triangularly shaped and the links in the medial portion 76 are substantially frusto-conically shaped. It should be noted that, in some embodiments, the medial portion 76 may be constructed in a different manner as compared to the first and second end portions 72 and 74, respectively. For example, the medial portion 76 may be a solid flat top type of conveying element while the first and the second end portions 72 and 74, respectively, may be a triangularly shaped type of conveying element.

Referring again to FIG. 1, in an assembled condition of the conveyor belt 10, each of the forward link spaces 30 of the link assembly 12 receives a portion of one of the rearward link ends 32 of an adjacently disposed link assembly 12 and each of the rearward link spaces 34 of the adjacently disposed link assembly 12 receives a portion of one of the forward link ends 28 of the one link assembly 12. One of the link shafts 14 extends through the forward shaft opening 24 of the one link assembly 12 and through the rearward shaft opening 26 of the adjacently disposed link assembly 12 for interconnecting adjacently disposed link assemblies 12. Each link shaft 14 has a first end 110 (FIGS. 1 and 6) disposed inwardly a predetermined distance from the first side 20 of the link assembly 12, and a second end 112 (FIGS. 1 and 7) disposed inwardly a predetermined distance from the second side 22 of the link assembly 12.

Shown in FIG. 5 is a side view of a segment of a conveyor belt 10a formed from two interconnected link assemblies 12a. The link assemblies 12a are identical in function and construction as the link assembly 12 except that the link assemblies 12a are provided with a substantially planar top surface 66a instead of the arcuately shaped top surface 66 (FIG. 3) provided on the link assembly 12. The planar top surface 66a of each of the link assemblies 12a cooperates with the planar top surface 66a of the other link assemblies 12a to provide the conveyor belt 10a with a substantially planar top surface 69a.

One of the link shafts 14 is shown in more detail in FIG. 6. The link shaft 14 is provided with a first shaft segment 114 and a second shaft segment 116. The first shaft segment 114 has a first end 118 and a second end 120. It should be noted that the first end 118 of the first shaft segment 114 is not provided with a shaft head extending radially therefrom so that the first shaft segment 114 is movable in a lateral direction 121 when the first shaft segment 114 is disposed in the forward and rearward shaft openings 24 and 26 of adjacently disposed link assemblies 12. A portion of the first link shaft segment 114 near the first end 118 thereof is tapered inwardly toward the first end 118 forming a tapered surface 124. A portion of the first shaft segment 114 near the second end 120 thereof is contoured to form a non-tapered or straight surface 126.

The second shaft segment 116 has a first end 128 and a second end 130. It should be noted that the first end 128 of the second shaft segment 116 is not provided with an outwardly extending shaft head so that the second shaft segment 116 is movable in the lateral direction 121 when the second shaft segment 116 is disposed in the forward and rearward shaft openings 24 and 26 of adjacently disposed link assemblies 12. A portion of the second shaft segment 116 near the first end 128 thereof is tapered inwardly toward the first end 128 forming a tapered surface 134. A portion of the second shaft segment 116 near the second end 130 thereof is contoured to form a non-tapered or straight surface 136.

The first end 118 of the first shaft segment 114 forms the first end 110 of the link shaft 14 and the first end 128 of the second shaft segment 116 forms the second end 112 of the link shaft 14. The link shaft 14 has a first diameter 138 disposed near the first and second ends 110 and 112, thereof, and a second diameter 140 disposed in a straight or non-tapered medial portion 141 of the link shaft 14. The first diameter 138 of the link shaft 14 is smaller than the second diameter 140 of the link shaft 14. Typically, the first diameter 138 of the link shaft 14 is about 0.1 inch and the second diameter 140 of the link shaft 14 is about 0.2 inch.

The tapered surfaces 124 and 134 of the first and second shaft segments 114 and 116, respectively, and the straight medial portion 141 of the link shaft 14 can be formed in a manner disclosed in U.S. Pat. No. 5,431,275, titled CONVEYOR BELT WITH ROTATABLE TAPERED LINK SHAFT, issued on Jul. 11, 1995 which disclosure is hereby expressly incorporated herein by reference.

As will be described in further detail below, the straight medial portion 141 of the link shaft 14 functions to carry the tensile load between adjacent link assemblies 12 as the conveyor belt 10 is travelling on a non-radial path. The tapered surfaces 124 and 134 function to carry the tensile load between adjacent link assemblies 12 as the conveyor belt 10 is traveling on a radial path. It will be realized that it depends in which direction the conveyor belt 10 is turning as to which of the tapered surfaces 124 and 134 the tensile load is transferred.

It should be noted that the second end 120 of the first shaft segment 114 is spaced a distance apart from the second end 130 of the second shaft segment 116 so that the first and second shaft segments 114 and 116 allow the link assemblies 12 to deflect (or bend) in a longitudinal direction which is desirable in some applications of the conveyor belt 10.

The link shaft 14 is desirably constructed of a rigid material, such as a metal or a plastic.

Shown in FIG. 7 and designated by the general reference numeral 14a is another embodiment of a link shaft constructed in accordance with the present invention. The link shaft 14a and the link shaft 14 are constructed and operate identically except that the link shaft 14a is formed as a single member. The link shaft 14a is desirably constructed of a rigid material, such as a metal or a plastic so that the link shafts 14a provide the conveyor belt 10 with lateral rigidity and prevent the link assemblies 12 from bending or deflecting under tensile load.

The cap member 15 which is disposed in the first opening 58 of the link assembly 12 for retaining the link shaft 14 in the forward shaft opening 24 of the link assembly 12 is shown in more detail in FIGS. 8 and 9. The cap member 15 is provided with a top flange portion 150, a bottom snap portion 152 and a medial or body portion 154 extending between the top flange portion 150 and the bottom snap portion 152. The medial portion 154 has a first planar side surface 156, a second planar side surface 158, a front surface 160, a back surface 162, and a bottom surface 164. The top flange portion has a first end 166 which extends outwardly past the front surface 160 of the medial portion 154 and a second end 168 which extends outwardly past the back surface 162 of the medial portion 154 for engaging the forward surface 31 of the link assembly 12 when the cap member 15 is disposed in the first opening 58 or the second opening 63 of the link assembly 12.

The medial portion 154 of the cap member 15 is disposed in the first opening 58 for closing the forward shaft opening 24, as previously discussed. The medial portion 154 of the cap member 15 is provided with a first length 169 extending between the top flange portion 150 and the bottom surface 164 of the medial portion 154 of the cap member 15. The first length 169 of the cap member 15 is substantially equal to the distance 62 (FIG. 3) of the first end link 54 so that the forward shaft opening 24 is substantially closed off when the cap member 15 is disposed within the first opening 58 of the link assembly 12. In addition, the bottom surface 164 of the medial portion 154 of the cap member 15 is shaped to mate against the first link shaft end receiving surface 60 of the link assembly 12 and the first side surface 156 and the second side surface 158 of the medial portion 154 of the cap member 15 are shaped to conform to the contours of the first and second sides, 40 and 42, respectively, of the first end link 54 so that the first end link 54 maintains its substantially triangular configuration.

The bottom snap portion 152 of the cap member 15 is disposed on the medial portion 154 of the cap member 15 and the medial portion 154 of the cap member 15 has a second length 170 which is substantially equal to the thickness 61 of the first end link 54 of the link assembly 12 such that when the cap member 15 is disposed in the first opening 58 of the link assembly 12, the bottom snap portion 152 of the cap member 15 extends a distance beyond the rearward surface 36 of the first end link 54 of the link assembly 12. The bottom snap portion 152 of the cap member 15 has an arcuately shaped first side 171 and an arcuately shaped second side 172. The first side 171 of the bottom snap portion 152 of the cap member 15 extends a distance outwardly from the front surface 160 of the medial portion 154 of the cap member 15 and the second side 172 extends a distance outwardly from the back surface 162 of the medial portion 154 of the cap member 15 so as to form a snap fit with the first link shaft end receiving surface 60 of the link assembly 12 thereby retaining the cap member 15 in an installed position within the first opening 58 of the link assembly 12. Typically, the link assembly 12 is constructed of a rigid material having elastic properties so that the first end link 54 of the link assembly 12 can expand slightly when the bottom snap portion 152 of the cap member 15 is disposed in the first opening 58 of the link assembly 12, and then contract slightly to secure the cap member 15 to the first end link 54 of the link assembly 12.

In FIG. 10 the conveyor belt 10 is depicted as travelling on a fixed radial path through an angle of about one hundred eighty degrees. It should be noted that the conveyor belt 10 may travel on the radial path through any desired angle and the conveyor belt 10 is shown in FIG. 10 as being turned through an angle of one hundred eighty degrees merely for illustrative purposes only. A radius 180 extends from a point 182 which is spaced a distance from the first side 20 of the link assemblies 12 of the conveyor belt 10.

Shown in FIG. 11 are three link assemblies 12b, 12c and 12d which are of identical construction to the link assembly 12 which has been discussed above with reference to FIG. 2. The link assemblies 12b, 121c and 12d are interconnected via two link shafts 14b and 14c. The link shafts 14b and 14c are of identical construction to the link assembly 14 which has been previously discussed with reference to FIG. 6. The link assembly 12b is provided with a rearward surface 36b which is configured to mate with a forward surface 31c of the link assembly 12c. The forward surface 31c of the link assembly 12c is spaced a predetermined distance laterally from the rearward surface 36b thereof so as to form a plurality of substantially uniform first gaps 184 (FIGS. 11 and 14) extending between a first side 40b of links 38b of the link assembly 12b and a first side 40c of links 38c of the link assembly 12c, and to form a plurality of substantially uniform second gaps 186 (FIGS. 11 and 14) extending between a second side 42b of the links 38b and a second side 42c of the links 38c. It should be noted that it is critical to the practice of the present invention that the link assemblies 12 and the link shafts 14 be constructed to provide the conveyor belt 10 with the first and second gaps 184 and 186 because the first and second gaps 184 and 186 permit each link assembly 12 to be displaced in a lateral direction relative to adjacently disposed link assemblies 12 so that the object discharging end of the conveyor belt 10 is laterally displaceable from the object receiving end thereof.

As shown in FIG. 12, the oblong forward and rearward shaft openings 24 and 26 of the link assembly 12, the mating configuration of the link assembly 12 and the first and second gaps 184 and 186 provided between adjacently disposed link assemblies 12 allow one link assembly 12 to be moved in a longitudinal direction relative to an adjacently disposed link assembly 12 such that the adjacently disposed link assemblies 12 are selectively expandable and contractible between a nested position (FIG. 12) wherein portions (in this case, portions near the first side 20) of the forward surface 31 of the one link assembly 12 is nestingly (or matingly) engaged with portions of the rearward surface 36 of the adjacently disposed link assembly 12 such that the forward link ends 28 of the one link assembly 12 engage the link shaft 14 disposed through the forward shaft opening 24 of the adjacently disposed link assembly 12, and an expanded position (FIGS. 1, 11, 12, and 14) wherein the forward surface 31 of the one link assembly 12 is spaced a distance longitudinally from the rearward surface 36 of the adjacently disposed link assembly 12. It should be noted that as the adjacently disposed link assemblies 12 are travelling on a non-radial path (FIGS. 1, 11, and 14) and are in tension, the link assemblies 12 are expanded to the expanded position and the one link assembly 12 is in a substantially parallel relationship to the adjacently disposed link assembly 12. However, as the adjacently disposed link assemblies 12 travel about a radial path (FIGS. 10 and 12), the adjacently disposed link assemblies 12 collapse or compress to the nested position relative to one another at one side (in this case the first side 20) of the link assemblies 12 but remain in the expanded position (or in tension) at the opposite side (in this case the second side 22) of the link assemblies 12.

As the link assemblies 12 decelerate toward the first side 20, the first and second gaps 184 and 186 formed between adjacently disposed link assemblies 12 allow adjacently disposed link assemblies 12 to rotate in a co-planar relation relative to one another. The tensile load is transferred toward the second side 22 of the link assemblies 12 thereby causing the link assemblies 12 to engage the tapered surface 134 of the link shafts 14. This results in the load between adjacent link assemblies 12 being distributed across several links 38 as the link assemblies 12 are travelling on the radial path, thus reducing the link assemblies 12 susceptibility to breakage. Obviously, if the link assemblies 12 are turned on a radius in a direction opposite to that shown, the link assemblies 12 decelerate toward the second side 22 and the load is distributed across the tapered surface 124 of the link shaft 14.

The specific configuration of the first and second end portions 72 and 74 of the link assemblies 12 allow the conveyor belt 10 to turn on a radius which is approximately twice as small as the radius on which the prior art conveyor belts can turn. The radius 180 on which the conveyor belt 10 can turn is typically limited by the distance that the link assemblies 12 are able to rotate relative to one another. In other words, the radius 180 on which the conveyor belt 10 can turn is limited by the translational and rotational movement permitted between adjacent link assemblies 12. While the length 96 of the oblong forward and rearward shaft openings 24 and 26 of the link assemblies 12 would seem to be the limiting factor, the conveyor belt 10 is typically not able to fully utilize the entire length 96 of the oblong forward and rearward shaft openings 24 and 26 of the link assemblies 12 because of structural interference between adjacent link assemblies 12 as the link assemblies 12 collapse and expand together.

The triangular shaped configuration of the links 38 in the first and second end portions 72 and 74 of the link assemblies 12, and the first and second gaps 184 and 186 formed between adjacent link assemblies 12 permit the link assemblies 12 to collapse or nest to the greatest extent permitted by the mating forward surface 31, the mating rearward surface 36 of the link assemblies 12, and the first diameter 138 of the link shaft 14 so that the conveyor belt 10 of the present invention can turn in a direction towards the first side 20 of the link assemblies 12 (shown in FIG. 12) and in an opposite direction towards the second side 22 of the link assemblies 12 (not shown) with as small a turning radius as possible.

The term "turning radius" as used herein means the ratio of the radius 180 divided by the width 23 of the link assemblies 12 of the conveyor belt 10. The conveyor belt 10 of the present invention has a turning radius which is less than about 1.0 and is typically about 0.80. The ability of the conveyor belt 10 of the present invention to traverse much tighter curves in both directions for a given belt width than a conventional conveyor belt is a significant advantage of the present invention.

To decrease the turning radius of the conveyor belt 10 further, the first diameter 138 (FIG. 6) of the link shaft 14 can be decreased so that adjacently disposed link assemblies 12 can collapse or nest to a greater extent on one side and expand to a greater extent on the other side. In addition, the thicknesses 29 of the forward link end 28, 33 of the rearward link end 32, 48 of the first side 40 and 50 of the second side 42 can be decreased so that adjacently disposed link assemblies 12 can collapse and expand to a greater extent. However, as the thicknesses 29 of the forward link end 28, 33 of the rearward link end 32, 48 of the first side 40 and 50 of the second side 42 are decreased, the link assemblies 12 become more susceptible to breakage. Typically, the thicknesses 29 of the forward link end 28, 33 of the rearward link end 32, 48 of the first side 40 and 50 of the second side 42 are about ⅛ of an inch.

The conveyor belt 10 of the present invention is also constructed to travel on predetermined or fixed non-radial paths in which the object discharging end of the conveyor belt 10 is laterally displaceable from the object receiving end thereof. As shown in FIG. 13, the conveyor belt 10 is divided into a first portion 200 and a second portion 202. The first portion 200 of the conveyor belt 10 has a first end 204 (FIG. 13) and a second end 206 (FIG. 13). The first and second sides 20 and 22 of the link assemblies 12 in the first portion 200 of the conveyor belt 10 are aligned and the first end 204 of the conveyor belt 10 is not disposed laterally from the second end 206 of the conveyor belt 10 such that the first portion 200 of the conveyor belt 10 is travelling on a straight path or non-angularly disposed path with respect to a reference line 208 (FIG. 13). In other words, the direction in which the first portion 200 of the conveyor belt 10 is travelling is substantially parallel to the reference line 208. When the conveyor belt 10 is travelling on the straight path (shown in more detail in FIGS. 1 and 11) the width of the first gap 184 (disposed laterally between the first sides 40 of the links 38 of the link assembly 12) substantially equals the width of the second gap 186 (disposed laterally between the second sides 42 of the links 38 of the link assembly 12).

The second portion 202 of the conveyor belt 10 has an object receiving end 210 (FIG. 13), an object discharging end 212 (FIG. 13), and a length 214 (FIG. 13) extending between the object receiving and object discharging ends 210 and 212 thereof. The object receiving end 210 of the conveyor belt 10 in the second portion 202 is fixed laterally and the object discharging end 212 of the conveyor belt 10 in the second portion 202 is also fixed laterally, but displaced a predetermined distance 216 (FIG. 13) laterally from the object receiving end 210 so that the conveyor belt 10 travels on an angularly disposed path with respect to the reference line 208 between the object receiving and object discharging ends 210 and 212 thereof. The angle 218 that the second portion 202 of the conveyor belt 10 is travelling with respect to the reference line 208 can vary widely, but the angle 218 is typically greater than 2°, desirably between about 2° to about 45°, and more desirable between about 2° to about 10°. It should be noted that each of the link assemblies 12 in the first and second portions 200 and 202 of the conveyor belt 10 are disposed in a substantially parallel relationship with the other link assemblies 12 in the first and second portions 200 and 202.

When the conveyor belt 10 is travelling on the angularly disposed path (shown in more detail in FIG. 14) the width of the first gap 184 (disposed laterally between the first sides 40 of the links 38 of the link assembly 12) is less than the width of the second gap 186 (disposed laterally between the second sides 42 of the links 38 of the link assembly 12) when the conveyor belt 10 is travelling towards the second side 22. Of course, the width of the first gap 184 would be greater than the width of the second gap 186 when the conveyor belt 10 is travelling towards the first side 20.

It should be noted that the distance 216 that the object discharging end 212 is displaced laterally from the object receiving end 210 (FIG. 13) can be greater than the width 23 of the conveyor belt 10 when the length 214 and the width 23 of the second portion 202 of the conveyor belt 10 has a ratio of desirably less than about 10:1 and more desirably of about 6:1.

The first and second gaps 184 and 186 formed between adjacently disposed link assemblies 12 permit each link assembly 12 to slide or move laterally relative to adjacent link assemblies 12 so that the conveyor belt 10 can travel on the straight path, the angularly disposed path and combinations thereof while maintaining each link assembly 12 in a substantially parallel relationship. It should be noted that the width of the first and second gaps 184 and 186 formed between adjacently disposed link assemblies 12 determine the maximum magnitude of the angle 218 to which the link assemblies 12 can move laterally. In other words, the wider the width of the first and second gaps 184 and 186 formed between adjacently disposed link assemblies 12, the greater the maximum magnitude of the angle 218. Typically the first and second gaps 184 and 186 formed between adjacently disposed link assemblies 12 are each about 3/32 of an inch when the conveyor belt 10 is travelling on the straight path.

Referring now to FIGS. 15, 16 and 17, the link assembly 12 of the conveyor belt 10 of the present invention can be provided with a hold down assembly 230 integrally connected to and extending from the bottom surface 68 of the link assembly 12. The hold down assembly 230 is positioned adjacent a guide rail 232 for stabilizing the link assembly 12 during travel of the conveyor belt 10. The hold down assembly 230 is provided with a substantially L-shaped body member 234 and a roller bearing 236. The roller bearing 236 is supported by the body member 234 so as to be disposed between the body member 234 and the guide rail 232 to provide rolling engagement therebetween such that friction between the body member 234 and the guide rail 232 is substantially reduced.

The body member 234 of the hold down assembly 230 is provided with a support portion 238 which is positioned near the guide rail 232 and a roller bearing support portion 240 extending below the roller bearing 236. The hold down assembly 230 is also provided with a pin 242 which is disposed through the first roller bearing support portion 240 and the roller bearing 236 and the pin 242 extends into the link assembly 12 so as to connect the roller bearing 236 to the roller bearing support portion 240 of the hold down assembly 230. Thus, the roller bearing 236 is supported at one end by the link assembly 12 and at an opposite end by the body member 234 of the hold down assembly 230.

The body member 234 is further provided with a retaining member 244 extending generally perpendicularly from the support portion 238 of the body member 234. The retaining member 244 of the body member 234 is disposed below the guide rail 232 so as to prevent vertical movement of the link assembly 12 relative to the guide rail 232 as the conveyor belt 10 travels along a conveyor path. The support portion 238, the roller bearing support portion 240 and the retaining member 244 of the body member 234 are typically integrally constructed and connected. However, the support portion 240, the roller bearing support portion 240 and the retaining member 244 of the body member 234 can be independently constructed and connected together via any suitable method, such as by welding, gluing or bolting.

Shown in FIG. 18 and designated by the general reference numeral 230a is another embodiment of a hold down assembly for the link assembly 12 of the conveyor belt 10 of the present invention. The hold down assembly 230a is substantially similar in construction and function to the hold down assembly 230 except as described hereinafter. The hold down assembly 230a is provided with a body member 234a having a first roller bearing support portion 246a extending below a roller bearing 236a and a second roller bearing support portion 248a extending above the roller bearing 236a. A pin 242a is disposed through the first and second roller bearing support portions 246a and 248a, respectively, and the roller bearing 236a for connecting the roller bearing 236a to the hold down assembly 230a. Thus, the roller bearing 236a is supported at both ends by the body member 234a.

Shown in FIG. 19 and designated by the reference numeral 300 is another embodiment of a link assembly for a conveyor belt 10b (FIG. 20) constructed in accordance with the present invention. The link assembly 300 is desirably integrally formed of a plastic or ceramic material, although it could be constructed of a metal. The link assembly 300 has a forward end 302, a rearward end 304, a first side 306, a second side 308, and a width 310 extending generally between the first side 306 and the second side 308. A forward shaft opening 312 extends through the forward end 302 of the link assembly 300 and a rearward shaft opening 314 extends through the rearward end 304 of the link assembly 300.

The link assembly 300 is characterized as having a first end portion 316, a second end portion 318 and a medial portion 320. The first end portion 316 of the link assembly 300 extends a predetermined distance from the first end 306 of the link assembly 300 towards the second end 308 of the link assembly 300. The medial portion 320 of the link assembly 300 extends a predetermined distance from the first end portion 316 of the link assembly 300 towards the second end 308 of the link assembly 300. The second end portion 318 of the link assembly 300 extends a predetermined distance from the medial portion 320 of the link assembly 300 to the second end 308 of the link assembly 300.

A plurality of forward link ends 322 are spaced across the forward end 302 of the link assembly 300. Only three forward link ends are designated in FIG. 19 by the reference numerals 322a, 322b and 322c. The forward link ends 322 are provided with a thickness 324 extending generally between the forward end 302 of the link assembly 300 and the forward shaft opening 312 provided therein. The forward link ends 322 define a plurality of forward link spaces 326 therebetween such that the link assembly 300 has a forward surface 328 forming a contiguous row of alternating forward link ends 322 and forward link spaces 326. Only three forward link spaces are designated in FIG. 19 by the reference numerals 326a, 326b, 326c.

A plurality of rearward link ends 330 are spaced across the rearward end 304 of the link assembly 300. Only three rearward link ends are designated in FIG. 19 by the reference numerals 330a, 330b, and 330c. The rearward link ends 330 are provided with a thickness 332 extending generally between the rearward end 302 of the link assembly 300 and the rearward shaft opening 314 provided therein. The rearward link ends 330 define a plurality of rearward link spaces 334 therebetween such that the link assembly 300 has a rearward surface 336 forming a contiguous row of alternating rearward link ends 330 and rearward link spaces 334. Only three rearward link spaces are designated in FIG. 19 by the reference numerals 334a, 334b, and 334c.

The link assembly 300 is further provided with a plurality of links 338. Only three links are designated in FIG. 19 by the reference numerals 338a, 338b,and 338c. Each link 338 has a first side 340, a second side 342, a closed forward end 344 defining one of the forward link ends 322, and an open rearward end 346 defining one of the rearward link spaces 334. The first side 340 and the second side 342 of each link 338 extend generally between the forward end 302 and the rearward end 304 of each link 338.

The second side 342 of each link 338 in the link assembly 300 is connected to the first side 340 of an adjacently disposed link 338 by one of the rearward link ends 330 to form a row of interconnected links 338 in the link assembly 300. The forward ends 344 of each link 338 cooperate to form the forward end 302 of the link assembly 300 and the rearward ends 346 of each link 338 cooperate to form the rearward end 304 of the link assembly 300.

The links 338 in the first end portion 316 of the link assembly 300 and in the second end portion 318 of the link assembly 300 have a width 350 which is less than a width 352 of the links 338 in the medial portion 320 of the link assembly 300. The medial portion 320 of the link assembly 300 has a first transitional link 354 disposed immediately adjacent the first end portion 316 of the link assembly 300, and a second transitional link 356 disposed immediately adjacent the second end portion 318 of the link assembly 300. The first and second transitional links 354 and 356, respectively, have a width 358 which is less than the width 352 of the remaining links 338 in the medial portion 320 of the link assembly 300, but which is greater than the width 350 of the links 338 in the first and second end portions 316 and 318, respectively, of the link assembly 300.

One of the links 338 is disposed adjacent the first side 306 of the link assembly 300 for forming a first end link 360 and one of the links 338 is disposed adjacent the second side 308 of the link assembly 300 for forming a second end link 362. The first side 340 of the first end link 360 forms the first side 306 of the link assembly 300 and the second side 342 of the second end link 362 forms the second side 308 of the link assembly 300. The first and the second end links 360 and 362 are substantially identical in construction. Thus, only the second end link 362 will be described in detail with reference to FIGS. 19 and 20.

The second end link 362 of the link assembly 300 is provided with a forward recess 364 and a rearward recess 366 extending inwardly into the second side 342 thereof. It should be noted that the second side 342 of the second end link 362 typically has a thickness 368 which is greater than a thickness 370 of the first and second sides 340 and 342 of the remaining links 338 in the link assembly 300 to provide additional support and strength along the second side 308 of the link assembly 300. The forward recess 364 of the second end link 362 is adapted to receive a portion of the rearward link end 330 of the second side 308 of an adjacently disposed link assembly 300 and the rearward recess 366 of the second end link 362 is adapted to receive a portion of the forward link end 322 of the second end link 362 of another adjacently disposed link assembly 300 in a connected position (FIG. 20).

A first shaft opening 372 is formed through each of the forward link ends 322 of the link assembly 300. The first shaft openings 372 are generally aligned and sized to receive a link shaft 374 (FIG. 21). The link shaft 374 will be described in more detail hereinafter. The first shaft openings 372 formed through each of the forward link ends 322 cooperate to form the forward shaft opening 312 of the link assembly 300.

A second shaft opening 376 is formed through each of the rearward link ends 330 of the link assembly 300. The second shaft openings 376 are generally aligned and sized to receive one of the link shafts 374. The second shaft openings 376 formed through each of the rearward link ends 330 cooperate to form the rearward shaft opening 314 of the link assembly 300. It should be noted that the first shaft opening 372 and the second shaft opening 376 are generally oblong shaped and have a length (not shown) and a width (not shown) greater than a diameter 378 (FIG. 21) of the link shafts 374 to permit movement of the link shafts 374 in the first and second shaft openings, 372 and 376, respectively, of the link assembly 300.

Shown in FIG. 20 is portion of a conveyor belt lob which is formed from a plurality of the link assemblies 300 interconnected via the link shafts 374. Only four of the link assemblies 300 and three of the link shafts 374 are shown in FIG. 20. In an assembled or connected condition of the conveyor belt 10b, each of the forward link spaces 326 of one of the link assemblies 300 receives a portion of one of the rearward link ends 330 of an adjacently disposed link assembly 300 and each of the rearward link spaces 334 of the adjacently disposed link assembly 300 receives a portion of one of the forward link ends 322 of another of the link assemblies 300. In addition, the forward recess 364 of each of the link assemblies 300 receives a portion of the rearward link end 330 of the second side 308 of an adjacently disposed link assembly 300 and the rearward recess 366 of each of the link assemblies 300 receives a portion of the forward link end 322 of the second end link 362 of an adjacently disposed link assembly 300. One of the link shafts 374 extends through the forward shaft opening 312 of each of the link assemblies 300 and through the rearward shaft opening 314 of the adjacently disposed link assembly 300 for interconnecting adjacently disposed link assemblies 300.

The conveyor belt 10b has a substantially continuous first side 380 and a substantially continuous second side 382. The first sides 306 of the link assemblies 300 cooperate to form the substantially continuous first side 380 of the conveyor belt 10b. Similarly, the second sides 308 of the link assemblies 300 cooperate to form the substantially continuous second side of the conveyor belt 10b.

One of the link shafts 374 for interconnecting adjacently disposed link assemblies 300 is shown in more detail in FIG. 21. The link shaft 374 has a first end 390, a second end 392 and a medial portion 394 extending therebetween. The medial portion 394 of the link shaft 374 has a cylindrically shaped outer peripheral surface 396 and the medial portion 394 of the link shaft 374 is provided with a substantially uniformed diameter 378.

A shaft head 398 is provided on the medial portion 394 of the link shaft 374 near the second end 392 thereof for retaining the link shaft 374 in the link assembly 300. The shaft head 396 extends a distance radially outwardly from the outer peripheral surface 396 of the medial portion 394 of the link shaft 374 substantially as shown.

It should be understood that the conveyor belt 10b is incapable of functioning in a same manner as the conveyor belt 10. That is, the conveyor belt 10b cannot travel on a radial path because of structural interference between adjacently disposed link assemblies 300 caused by the thickness 368 of the second side 342 of the second end link 362 of the link assembly 300 being greater than the thickness 370 of the first and second sides 340 and 342 of the remaining links 338 in the link assembly 300. In addition, the conveyor belt 10b cannot travel on the angularly disposed path because the first end link 360 of the link assembly 300 is constructed to matingly receive the first end link 360 of an adjacently disposed link assembly and the second end link 362 of the one link assembly 300 is constructed to matingly receive the second end link 362 of the adjacently disposed link assembly 300 so that a gap is not formed between the first end links 360 and the second end links 362 of adjacently disposed link assemblies 300.

In addition, it should also be noted that the link assembly 300 is not provided with serrations in the first and third portions 316 and 318 thereof because the conveyor belt 10b formed from the link assemblies 300 is not adapted to travel on a radial path.

Shown in FIG. 22 and designated by the reference numeral 500 is another embodiment of a link assembly which is constructed in accordance with the present invention. The link assembly 500 has a forward end 502, a rearward end 504, a first side 506, a second side 508 and a width 510 extending generally between the first side 506 and the second side 508 of the link assembly 500. A forward shaft opening 512 (FIGS. 22 and 23) extends through the forward end 502 of the link assembly 500 and a rearward shaft opening 514 (FIGS. 22 and 23) extends through the rearward end 504 of the link assembly 500.

A plurality of forward link ends 516 are spaced across the forward end 502 of the link assembly 500. Only two forward link ends 516 are designated in FIG. 22 by the references numerals 516a and 516b. The forward link ends 516 of the link assembly 500 are provided with a thickness 518 extending generally between the forward end 502 and the forward shaft opening 512. The forward link ends 516 of the link assembly 500 define a plurality of forward link spaces 520 therebetween such that the link assembly 500 has a forward surface 522 forming a contiguous row of alternating forward link ends 516 and forward link spaces 520. Only two forward link spaces 520 are designated in FIG. 22 by the references numerals 520a and 520b.

A plurality of rearward link ends 524 are spaced across the rearward end 504 of the link assembly 500. Only two rearward link ends 524 are designated in FIG. 22 by the references numerals 524a and 524b. The rearward link ends 524 of the link assembly 500 are provided with a thickness 526 extending generally between the rearward end 504 and the rearward shaft opening 514 of the link assembly 500. The rearward link ends 524 define a plurality of rearward link spaces 528 therebetween such that the link assembly 500 has a rearward surface 530 forming a contiguous row of alternating rearward link ends 524 and rearward link spaces 528. Only two rearward link spaces 528 are designated in FIG. 22 by the reference numerals 528a and 528b.

The link assembly 500 is further provided with a plurality of links 532. Only two links 532 are designated in FIG. 22 by the reference numerals 532a and 532b. Each link 532 has a first side 534, a second side 536, a closed forward end 538 defining one of the forward link ends 516, and an open rearward end 540 defining one of the rearward link spaces 528. The first side 534 and the second side 536 of each link 532 extend generally between the forward end 538 and the rearward end 540 of each link 532. Each of the first sides 534 of the links 532 are provided with a substantially uniform thickness 542 and each of the second sides 536 of the links 532 are provided with a substantially uniform thickness 544. The thickness 542 of the first side 534 of the links 532 is substantially equal to the thickness 544 of the second side 536 of the links 532.

The second side 536 of each link 532 in the link assembly 500 is connected to the first side 534 of an adjacently disposed link 532 by one of the rearward link ends 524 to form a row of interconnected links 532 in the link assembly 500. The forward ends 538 of each link 532 cooperate to form the forward end 502 of the link assembly 500 and the rearward ends 540 of each link 532 cooperate to form the rearward end 504 of the link assembly 500.

One of the links 532 is disposed adjacent the first side 506 of the link assembly 500 for forming a first end link 548 and one of the links 532 is disposed adjacent the second side 508 of the link assembly 500 for forming a second end link 550. The first side 534 of the first end link 548 forms the first side 506 of the link assembly 500 and the second side 536 of the second end link 550 forms the second side 508 of the link assembly 500.

The link assembly 500 is provided with a first opening 552 extending through the forward link end 516 of the first end link 548 such that the first opening 552 is disposed between the forward end 538 and the rearward end 540 thereof and defines a first link shaft end receiving surface 554. The first end link 548 has a thickness 556 extending between the forward surface 522 and the rearward surface 530 of the link assembly 500. The first link shaft end receiving surface 554 is disposed a distance 558 from the forward surface 522 of the first end link 548. One of the cap members 15, which was described herein in detail with respect to FIGS. 8 and 9, is disposed in the first opening 552 (FIG. 23) of the link assembly 500 for closing the forward shaft opening 512 of the link assembly 500 and for closing the rearward shaft opening 514 of an adjacently disposed link assembly 500 so as to retain the link shaft 14 in the link assemblies 500.

The link assembly 500 is further provided with a second opening 560 extending through the forward link end 516 of the second end link 550 such that the second opening 560 is disposed between the forward end 538 and the rearward end 540 thereof for defining a second link shaft end receiving surface 562. One of the cap members 15 is disposed in the second opening 560 for closing the forward shaft opening 512 of the link assembly 500 and for closing the rearward shaft opening 514 of an adjacently disposed link assembly 500 so as to retain the link shaft 14 in the link assemblies 500.

The second opening 560 and the second link shaft end receiving surface 562 of the link assembly 500 are substantially identical in construction to the first opening 552 and the first link shaft end receiving surface 554, respectively, of the link assembly 500. Thus, only the first opening 552 and the first link shaft end receiving surface 554 of the link assembly 500 are shown and described in detail herein.

The link assembly 500 is characterized as having a first portion 564 and a second portion 566. The first portion 564 of the link assembly 500 extends a distance from the first end 506 of the link assembly 500 towards the second end 508 of the link assembly 500. The second portion 566 of the link assembly 500 extends a distance from the first portion 564 of the link assembly 500 to the second end 508 of the link assembly 500.

The first portion 564 of the link assembly 500 is further characterized as having a first end portion 568 and a first medial portion 570. The first end portion 568 of the first portion 564 of the link assembly 500 extends a predetermined distance from the first end 506 of the link assembly 500; and the first medial portion 570 of the first portion 564 of the link assembly 500 extends a predetermined distance from the first end portion 568 of the first portion 564 of the link assembly 500 to the second portion 566 thereof.

The second portion 566 of the link assembly 500 is further characterized as having a second medial portion 572 and a second end portion 574. The second medial portion 572 of the second portion 566 of the link assembly 500 extends a predetermined distance from the first portion 564 towards the second end 508 of the link assembly 500; and the second end portion 574 of the link assembly 500 extends a predetermined distance from the second medial portion 572 of the second portion 566 of the link assembly 500 to the second end 508 of the link assembly 500.

Each of the links 532 in the first portion 564 of the link assembly 500 have a substantially uniform height 576. The links 532 in the first end portion 568 and in the second end portion 574 of the link assembly 500 have a width 578 which is less than a width 580 of the links 532 in the first medial portion 570 and the second medial portion 572 of the link assembly 500. The first medial portion 570 of the link assembly 500 has a first transitional link 582 (FIG. 22) disposed immediately adjacent the first end portion 568 of the link assembly 500. The first transitional link 582 has a width 584 which is greater than the width 578 of the links 532 in the first end portion 568 of the link assembly 500, but which is less than the width 580 of the remaining links 532 in the first medial portion 570 of the link assembly 500.

The second medial portion 572 of the link assembly 500 has a second transitional link 586 disposed immediately adjacent the second end portion 574 of the link assembly 500. The second transitional link 586 has a width 588 which is greater than the width 578 of the links 532 in the second end portion 574 of the link assembly 500, but which is less than the width 580 of the remaining links 532 in the second medial portion 572 of the link assembly 500. It should be noted that the height of the links 532 in the second portion 566 of the link assembly 500 taper upwardly towards the second end 508 of the link assembly 500. Specifically, the second portion 566 of the link 532 disposed immediately adjacent the first portion 564 of the link assembly 500 has a first height 590 which is less than a second height 592 of the link 532 disposed adjacent the second end 508 of the link assembly 500.

A plurality of serrations 594 are formed on a portion of the forward surface 522 of the link assembly 500 and on a portion of the rearward surface 530 of the link assembly 500 in the first end portion 568 thereof. The serrations 594 of the link assembly 500 are configured to intermesh with the serrations 594 of an adjacently disposed link assembly 500 when the forward surface 522 of the one link assembly 500 is mated with the rearward surface 530 of the adjacently disposed link assembly 500, as shown in FIG. 23. In this position, the serrations 594 of the one link assembly 500 engage the serrations 594 of the adjacently disposed link assembly 500 such that the adjacently disposed link assemblies 500 are locked together for preventing inboard friction or motion between the adjacently disposed link assemblies 500 when the adjacently disposed link assemblies 500 are travelling on a radial path or when the object discharging end of a conveyor belt formed from the link assemblies 500 is laterally displaced relative to the object receiving end of the conveyor belt.

A first shaft opening 596 is formed through the forward link ends 516 of the link assembly 500. The first shaft openings 596 are generally aligned and sized to receive one of the link shafts 14. The first shaft openings 596 cooperate to form the forward shaft opening 512 of the link assembly 500. Each of the first shaft openings 596 has a substantially uniform length 598.

A second shaft opening 600 is formed through the rearward link ends 524 of the link assembly 500. The second shaft openings 600 are generally aligned and sized to receive one of the link shafts 14. The second shaft openings 600 cooperate to form the rearward shaft opening 514 of the link assembly 500. It should be noted that the first shaft opening 596 and the second shaft opening 600 of the link assembly 500 are generally oblong shaped to permit movement of the link shafts 14 in the first and second shaft openings 596 and 600, respectively, such that the link assemblies 500 are selectively movable in a longitudinal direction and a lateral direction relative to adjacently disposed link assemblies 500 for a purpose to be described hereinafter.

It should be noted that the second shaft openings 600 of the link assembly 500 have a substantially uniform length 602 in the first portion 564 of the link assembly 500. However, the length 602 of the second shaft openings 600 tapers upwardly throughout the second portion 566 of the link assembly 500. That is, the length 602 of the second shaft openings 600 of the link assembly 500 becomes progressively larger from the first portion 564 to the second end 508 of the link assembly 500 so that each of the link assemblies 500 can expand to a greater extent than the link assemblies 12 when the link assemblies 500 are travelling on a radial path.

Each of the link assemblies 500 is typically an integrally formed link assembly constructed of a plastic, ceramic or metal material and the first end portion 568, the first medial portion 570, the second medial portion 572 and the second end portion 574 of the link assemblies 500 are integrally constructed and connected. In some embodiments, the first and second portions 564 and 566, respectively, of the link assemblies 500 may be formed from multiple interconnected or non-interconnected intermediate portions to form the link assembly 500. Alternately, or in addition, the first end portion 568 and the second end portion 574 of the link assemblies 500 may be separate elements interconnected or non-interconnected with the first and second medial portions 570 and 572, respectively, to form the link assembly 500. Typically, the links 532 in the first and second end portions 568 and 574, respectively, of the link assemblies 500 are substantially triangularly shaped and the links in the first and second medial portions 570 and 572 of the link assemblies 500 are substantially frusto-conically shaped. It should be noted that, in some embodiments, the first and second medial portions 570 and 572 of the link assemblies 500 may be constructed in a different manner as compared to the first and second end portions 568 and 574 of the link assemblies 500. For example, the first medial portion 570 and the second medial portion 572 of the link assemblies 500 may be a solid flat top type of conveying element while the first and the second end portions 568 and 574 of the link assemblies 500 may be the triangularly shaped type of conveying element.

Shown in FIG. 23 is a portion of a conveyor belt 10c constructed of a plurality of link assemblies 500 interconnected via a plurality of link shafts 14. The link shafts 14 are maintained within the link assemblies 500 by a plurality of cap members 15.

Each of the forward link spaces 520 of the link assembly 500 of the conveyor belt 10c receives a portion of one of the rearward link ends 524 of an adjacently disposed link assembly 500 and each of the rearward link spaces 528 of the adjacently disposed link assembly 500 receives a portion of one of the forward link ends 516 of the one link assembly 500. One of the link shafts 14 extends through the forward shaft openings 512 of the one link assembly 500 and through the rearward shaft openings 514 of the adjacently disposed link assembly 500 for interconnecting the adjacently disposed link assemblies 500. Each link shaft 14 has the first end 110 (FIGS. 1 and 6) disposed inwardly a predetermined distance from the first side 506 of the link assembly 500, and the second end 112 (FIGS. 1 and 6) is disposed inwardly a predetermined distance from the second side 508 of the link assembly 500.

The conveyor belt 10c is substantially identical in operation as the conveyor belt 10 previously described herein except that the conveyor belt 10c can only turn in one direction (unidirectionally), in this case, towards the first side 506 of the link assemblies 500.

Shown in FIG. 24 is a side view of a segment of the conveyor belt 10c which is formed from two adjacently disposed and interconnected link assemblies 500. Each of the link assemblies 500 has an arcuately shaped top surface 604 which cooperates with the top surfaces 604 of the other link assemblies 500 to provide the conveyor belt 10c with a top surface 606 having a scalloped configuration. The link assembly 500 is further provided with a bottom surface 608. An indentation 610 is formed in the bottom surface 608 of the link assembly 500. The indentation 610 extends between the first side 506 and the second side 508 of the link assembly 500.

Shown in FIG. 25 is a side view of a segment of a conveyor belt 10d which is constructed in accordance with the present invention. The conveyor belt 10d is formed from two interconnected link assemblies 500a which are identical in function and construction as the link assembly 500 except that the link assembly 500a is provided with a substantially planar top surface 604a instead of the arcuately shaped top surface 604 (FIG. 24) of the link assembly 500. The top surface 604a of each of the link assemblies 500a cooperates with the top surfaces 604a of the other link assemblies 500 in the conveyor belt 10d to provide the conveyor belt 10d with a substantially planar top surface 606a.

The specific configuration of the first and second portions 564 and 566 of the link assemblies 500 allow the conveyor belt 10c to turn on a radius which is less than is possible with the prior art conveyor belts. The radius 180 (FIG. 10) on which the conveyor belt 10c can turn is typically limited by the distance that the link assemblies 500 are able to rotate relative to one another. In other words, the radius 180 on which the conveyor belt 10c can turn is limited by the translational and rotational movement permitted between adjacent link assemblies 500. The length 602 of the second shaft openings 600 of the link assemblies 500 become progressively larger in the second portion 566 of the link assembly 500 so that each of the link assemblies 500 can expand to a greater extent near the second side 508 of the link assembly 500 and thereby decrease the turning ratio of the conveyor belt 10c.

The conveyor belt 10c of the present invention has a turning radius which is less than about 0.50. The ability of the conveyor belt 10c of the present invention to traverse much tighter curves in one direction for a given belt width than a conventional conveyor belt is a significant advantage of the present invention. It will be understood that the link assembly 500 of the present invention can be adapted to turn in a direction towards the second side 508 of the link assembly 500 by reversing the first and second portions 564 and 566 of the link assemblies 500.

The conveyor belt 10c of the present invention is also constructed to travel on predetermined or fixed non-radial paths in which an object discharging end of the conveyor belt 10c is laterally displaceable from an object receiving end thereof in a similar manner as the conveyor belt 10 as described in detail previously with respect to FIGS. 11, 13 and 14.

Although the radial path, straight path and angularly disposed path of the conveyor belts disclosed herein have been described separately, it should be understood that the endless conveyor belts are adapted to permit portions of the conveyor belts to simultaneously travel on the radial path, the straight path and the angularly disposed path.

The ability of the conveyor belts 10 and 10a of the present invention to bi-directionally traverse much tighter curves than prior art conveyor belts and of the conveyor belts 10c and 10d to unidirectionally traverse much tighter curves than the prior art conveyor belts while also permitting portions of the conveyor belts 10, 10a, 10c, and 10d to simultaneously travel on the radial path, the straight path and the angularly disposed path is clearly an improvement over the prior art conveyor belts. In addition, the ability-to displace the endless conveyor belts 10, 10a, 10c, and 10d laterally permits the design of a conveyor path having two or more parallel and laterally displaced fixed conveying paths which adds a great deal of versatility to the design of fixed conveying paths. Furthermore, the unique design of the endless conveyor belt 10 permits portions of the conveyor belt to travel on a fixed radial conveying path in one direction and then immediately travel on a fixed radial conveying path turned in an opposite direction without utilizing a fixed straight conveying path therebetween.

The exact dimensions and proportions of the elements described herein are not essential to the practice of the present invention, but are intended to illustrate the general nature of the embodiments of the present invention. Changes may be made in the embodiments of the invention described herein, or in the parts or the elements of the embodiments described herein, or in the steps or sequence of steps of the methods described herein, without departing from the spirit and/or the scope of the invention as defined in the following claims.

What is claimed is:

1. A conveyor belt having an object receiving end and an object discharging end, the object discharging end being laterally displaceable relative to the object receiving end, the conveyor belt comprising:

a plurality of link assemblies, each of the link assemblies having a forward end, a rearward end, a first side and a second side, a forward shaft opening extending through the forward end of each link assembly and a rearward shaft opening extending through the rearward end of each link assembly;

a plurality of link shafts for interconnecting adjacently disposed link assemblies such that the link assemblies are laterally movable relative to adjacently disposed link assemblies, one of the link shafts extending through the forward shaft opening of each of the link assemblies and through the rearward shaft openings of an adjacently disposed link assembly, each link shaft having a first end disposed inwardly a distance from the first side of each of the link assemblies, and a second end disposed inwardly a distance from the second side of each of the link assemblies; and wherein the link assemblies are constructed to permit the conveyor belt to turn bi-directionally with a turning ratio of less than 1.0 in both directions.

2. The conveyor belt of claim 1 wherein each of the link assemblies further comprises mating forward and rearward surfaces, the forward surface of one link assembly being spaced a distance laterally from the rearward surface of an adjacent link assembly so as to permit lateral movement of one link assembly relative to the adjacent link assembly of at least 20.

3. The conveyor belt of claim 2 wherein the conveyor belt has a first side, a second side, a width extending between the first and second sides of the conveyor belt, and a length extending between the object receiving end and the object discharging end of the conveyor belt, the object receiving end of the conveyor belt being fixed laterally and the object discharging end of the conveyor belt being displaced laterally from the object receiving end of the conveyor belt a distance greater than the width of the belt with each of the link assemblies being disposed in a substantially parallel relationship to each of the other link assemblies and the length and width of the conveyor belt having a ratio of less than about 10:1.

4. The conveyor belt of claim 2 wherein the forward surface of one link assembly is spaced a distance laterally from the rearward surface of an adjacent link assembly so as to permit lateral movement of one link assembly relative to the adjacent link assembly of from about 20° to about 10°.

5. The conveyor belt of claim 2 wherein each pair of link assemblies is selectively collapsible and expandable in a longitudinal direction between a nested position wherein the forward surface of one link assembly is nested against the rearward surface of an adjacent link assembly, and an expanded position wherein the forward surface of one link assembly is spaced a distance longitudinally from the rearward surface of the adjacent link assembly, each pair of link assemblies being in the expanded position and each pair of link assemblies being disposed in a substantially parallel relationship to each of the other link assemblies when the pair of link assemblies are travelling on a straight path.

6. The conveyor belt of claim 5 wherein each pair of link assemblies is selectively collapsed to the nested position near one end of each link assembly and each pair of link assemblies is also selectively expanded to the expanded position near an opposite end of each link assembly when the pair of link assemblies is travelling on a radial path.

7. The conveyor belt of claim 6 wherein the conveyor belt further comprises:

locking means disposed on each link assembly for locking adjacent link assemblies together when the adjacent link assemblies are travelling on the radial path so as to prevent inboard friction between adjacent link assemblies and to maintain portions of each link assembly in the nested position.

8. The conveyor belt of claim 7 wherein the locking means further comprises:

a plurality of serrations formed on a portion of the forward and rearward surfaces of each link assembly near the first and second ends thereof, the serrations of one link assembly being configured to intermesh with the serrations of an adjacent link assembly when the link assemblies are in the nested positioned whereby the serrations lock adjacent link assemblies together when such adjacent link assemblies are turning on a radius.

9. The conveyor belt of claim 1 wherein the link assemblies are defined further as having a top surface, the top surface of each of the link assemblies cooperating with the top surfaces of the other link assemblies to provide the conveyor belt with a top surface, the top surfaces of the link assemblies having an arcuate configuration such that the top surface of the conveyor belt is provided with a scalloped configuration for prevent chordial chatter when the conveyor belt is travelling around a dead top.

10. The conveyor belt of claim 1 wherein each of the link assemblies further comprises:

a plurality of forward link ends spaced across the forward end of the link assembly, the forward link ends defining a plurality of forward link spaces therebetween such that the link assembly has a forward surface forming a contiguous row of alternating forward link ends and forward link spaces;

a plurality of rearward link ends spaced across the rearward end of the link assembly, the rearward link ends defining a plurality of rearward link spaces therebetween such that the link assembly has a rearward surface forming a contiguous row of alternating rearward link ends and rearward link spaces, each of the forward link spaces receiving a portion of one of the rearward link ends of an adjacent link assembly and each of the rearward link spaces of the adjacent link assembly receiving a portion of one of the forward link ends of the one link assembly, the forward surface of the one link assembly being spaced a distance laterally from the rearward surface of the adjacent link assembly such that the adjacent link assembly is selectively movable at least 2° laterally relative to the adjacently disposed link assembly.

11. The conveyor belt of claim 10 wherein each of the link assemblies further comprise:

a first shaft opening formed through the forward link ends, the first shaft openings being generally aligned and sized to receive one of the link shafts, the first shaft openings cooperating to form the forward shaft opening of the link assembly; and a second shaft opening formed through the rearward link ends, each second shaft opening being generally aligned and sized to receive one of the link shafts, the second shaft openings cooperating to form the rearward shaft opening of each of the link assemblies, the first and second shaft openings being generally oblong shaped such that the link assemblies are selectively movable in a longitudinal direction relative to adjacently disposed link assemblies.

12. The conveyor belt of claim 11 wherein each link assembly further comprises:

a plurality of links, each link having a first side, a second side, a closed forward end and an open rearward end defining one of the rearward link spaces, the forward end of each link forming one of the forward link ends of the link assembly and the first and second sides extending generally between the forward and rearward ends of each link; and wherein the second side of each link in the link assembly is connected to the first side of an adjacent link in the link assembly by one of the rearward link ends to form a row of links in each link assembly with the forward ends of each link cooperating to form the forward end of the link assembly and the rearward ends of each link cooperating to form the rearward end of each link assembly, one of the links being disposed adjacent the first side of the link assembly for forming a first end link and one of the links being disposed adjacent the second side of the link assembly for forming a second end link, the first side of the first end link forming the first side of the link assembly and the second side of the second end link forming the second side of the link assembly.

13. The conveyor belt of claim 12 wherein each of the link assemblies is defined further as comprising:

a first opening extending through the forward link end of the first end link between the forward end and rearward end thereof for defining a first link shaft end receiving slot.

14. The conveyor belt of claim 12 wherein each of the link assemblies is defined further as comprising:

a second opening extending through the forward link end of the second end link between the forward end and rearward end thereof for defining a second link shaft end receiving slot.

15. The conveyor belt of claim 12 wherein each of the link assemblies is defined further as being divided into a first end portion, a second end portion and a medial portion, the first end portion extending a predetermined distance from the first end of the link assembly towards the second end of the link assembly, the medial portion extending a predetermined distance from the first end portion towards the second end of the link assembly and the second end portion extending a predetermined distance from the medial portion to the second end of the link assembly, each of the links in the first and second end portions having a width less than the width of the links in the medial portion.

16. The conveyor belt of claim 15 wherein the links in the first and second end portions are substantially triangularly shaped and the links in the medial portion are substantially frustoconically shaped.

17. The conveyor belt of claim 15 wherein the medial portion of the link assembly has a first transitional link disposed immediately adjacent the first end portion, and a second transitional link disposed immediately adjacent the second end portion, each of the first and second transitional links having a width less than the width of the remaining links in the medial portion and greater than the width of the links in the first and second end portions.

18. The conveyor belt of claim 1 wherein each of the link shafts further comprise:

two elongated shaft segments, each of the shaft segments having a first end and a second end, the first end of one of the shaft segments forming the first end of the link shaft and the first end of the other shaft segment forming the second end of the link shaft, the shaft segments being laterally movable in the forward and rearward shaft openings of the link assemblies.

19. The conveyor belt of claim 18 wherein each of the shaft segments has a tapered portion extending a predetermined distance from the first end towards the second end thereof, and a nontapered portion extending a predetermined distance from the tapered portion to the second end thereof, the non-tapered portions of the shaft segments being engageable with a portion of the link assemblies such that the non-tapered portions of the shaft segments carry the tensile load between adjacent link assemblies as the link assemblies are travelling on a non-radial path, the tapered portions of the shaft segments being engageable with portions of the link assemblies such that the tapered portion of one of the shaft segments carries the tensile load between adjacent link assemblies as the link assemblies are travelling on a radial path.

20. The conveyor belt of claim 19 wherein the non-tapered portions of the shaft segments have a non-circular cross-section.

21. The conveyor belt of claim 1 wherein each of the links shafts is defined further as being a single member, which is movable in a lateral direction in the forward and rearward shaft openings of the link assembly.

22. The conveyor belt of claim 21 wherein the link shafts have a tapered portion extending a predetermined distance from the first end towards the second end thereof, and a non-tapered portion extending a predetermined distance from the tapered portion to the second end thereof, the non-tapered portions of the link shafts being engageable with a portion of the link assemblies such that the non-tapered portions of the link shafts carry the tensile load between adjacent link assemblies as the link assemblies are travelling on a non-radial path, the tapered portions of the link shafts being engagable with portions of the link assemblies such that the tapered portions of the link shafts carry the tensile load between adjacent link assemblies as the link assemblies are travelling on a radial path.

23. The conveyor belt of claim 21 wherein the non-tapered portions of the link shafts have a non-circular cross-section.

24. The conveyor belt of claim 1 wherein each of the link assemblies further comprise a bottom surface having an indentation formed therein, the indentation extending between the first and second sides of the link assembly.

25. The conveyor belt of claim 1 wherein the conveyor belt has a portion travelling on a radial path and another portion travelling on an angularly disposed path.

26. The conveyor belt of claim 1 further comprising:
a plurality of cap members, each cap member connected to one of the link assemblies so as to close off the forward shaft opening of the link assembly between the link shaft and one side of the link assembly whereby the link shaft is engageable with the cap member for preventing the link shaft from exiting from the link assembly.

27. The conveyor belt of claim 26 wherein two cap members are connected to each of the link assemblies such that one of the link shafts is interposed between the two cap members for retaining the one link shaft within the link assembly.

28. The conveyor belt of claim 1 further comprising:
a guide rail having a top side and a bottom side, the guide rail extending between the object receiving end of the conveyor belt and the object discharging end of the conveyor belt for guiding the conveyor belt along a predetermined conveyor path, the conveyor belt being disposed substantially adjacent the top side of the guide rail;
wherein each of a preselected group of the link assemblies further comprises:
  a body member extending from the link assembly such that the body member is disposed adjacent the guide rail;
  a roller bearing disposed between the body member and the guide rail to provide rolling engagement therebetween such that friction between the body member and the guide rail is substantially reduced.

29. The conveyor belt of claim 28 wherein each of the body members further comprises:
a retaining member extending from the body member such that the retaining member is disposed substantially adjacent the bottom side of the guide rail so as to prevent vertical movement of the conveyor belt relative to the guide rail as the conveyor belt travels along the predetermined conveyor path.

30. A conveyor belt having an object receiving end and an object discharging end, comprising:
a plurality of link assemblies, each of the link assemblies having a forward end, a rearward end, a first side, a second side, a forward surface and a rearward surface configured to mate with the forward surface, a forward shaft opening extending through the forward end of each link assembly and a rearward shaft opening extending through the rearward end of each link assembly;
a plurality of link shafts for interconnecting adjacently disposed link assemblies such that the link assemblies are laterally movable relative to adjacently disposed link assemblies, one of the link shafts extending through the forward shaft opening of each of the link assemblies and through the rearward shaft openings of an adjacently disposed link assembly;
wherein the forward surface of one link assembly can be spaced a distance laterally from the rearward surface of an adjacently disposed link assembly so as to permit lateral movement of one link assembly relative to the adjacently disposed link assembly of at least 2° while the adjacently disposed link assemblies are maintained in a substantially parallel relationship as the conveyor belt travels on a non-radial path.

31. The conveyor belt of claim 30 wherein the conveyor belt has a first side, a second side, a width extending between the first and second sides of the conveyor belt, and a length extending between the object receiving end and the object discharging end of the conveyor belt, the object discharging end of the conveyor belt being displaced laterally from the object receiving end of the conveyor belt a distance greater than the width of the conveyor belt with each of the link assemblies being disposed in a substantially parallel relationship to each of the other link assemblies and the length and width of the conveyor belt having a ratio of less than about 10:1.

32. The conveyor belt of claim 30 wherein each pair of link assemblies is selectively collapsible and expandable in a longitudinal direction between a nested position wherein the forward surface of one link assembly is nested against the rearward surface of an adjacent link assembly, and an expanded position wherein the forward surface of one link assembly is spaced a distance longitudinally from the rearward surface of the adjacent link assembly, each pair of link assemblies being in the expanded position and each pair of link assemblies being disposed in a substantially parallel relationship to each of the other link assemblies when the pair of link assemblies are travelling on a straight path.

33. The conveyor belt of claim 30 wherein each pair of link assemblies is selectively collapsed to the nested position near one end of each link assembly and each pair of link assemblies is also selectively expanded to the expanded position near an opposite end of each link assembly when the pair of link assemblies is travelling on a radial path.

34. The conveyor belt of claim 33 wherein the conveyor belt further comprises:
locking means disposed on each link assembly for locking adjacent link assemblies together when the adjacent link assemblies are travelling on the radial path so as to prevent inboard friction between adjacent link assemblies and to maintain portions of each link assembly in the nested position.

35. The conveyor belt of claim 34 wherein the locking means further comprises:
a plurality of serrations formed on a portion of the forward and rearward surfaces of each link assembly near the first and second ends thereof, the serrations of one link assembly being configured to intermesh with the serrations of an adjacent link assembly when the link assemblies are in the nested positioned whereby the serrations lock adjacent link assemblies together when such adjacent link assemblies are turning on a radius.

36. The conveyor belt of claim 30 wherein the link assemblies are defined further as having a top surface, the top surface of each of the link assemblies cooperating with the top surfaces of the other link assemblies to provide the conveyor belt with a top surface, the top surfaces of the link assemblies having an arcuate configuration such that the top surface of the conveyor belt is provided with a scalloped configuration for prevent chordial chatter when the conveyor belt is travelling around a dead top.

37. The conveyor belt of claim 30 wherein each of the link assemblies further comprises:
a plurality of forward link ends spaced across the forward end of the link assembly, the forward link ends defining a plurality of forward link spaces therebetween such that the link assembly has a forward surface forming a contiguous row of alternating forward link ends and forward link spaces;

a plurality of rearward link ends spaced across the rearward end of the link assembly, the rearward link ends defining a plurality of rearward link spaces therebetween such that the link assembly has a rearward surface forming a contiguous row of alternating rearward link ends and rearward link spaces, each of the forward link spaces receiving a portion of one of the rearward link ends of an adjacent link assembly and each of the rearward link spaces of the adjacent link assembly receiving a portion of one of the forward link ends of the one link assembly.

38. The conveyor belt of claim 37 wherein each of the link assemblies further comprise:

a first shaft opening formed through the forward link ends, the first shaft openings being generally aligned and sized to receive one of the link shafts, the first shaft openings cooperating to form the forward shaft opening of the link assembly; and a second shaft opening formed through the rearward link ends, each second shaft opening being generally aligned and sized to receive one of the link shafts, the second shaft openings cooperating to form the rearward shaft opening of each of the link assemblies, the first and second shaft openings being generally oblong shaped such that the link assemblies are selectively movable in a longitudinal direction relative to adjacently disposed link assemblies.

39. The conveyor belt of claim 38 wherein each link assembly further comprises:

a plurality of links, each link having a first side, a second side, a closed forward end and an open rearward end defining one of the rearward link spaces, the forward end of each link forming one of the forward link ends of the link assembly and the first and second sides extending generally between the forward and rearward ends of each link; and wherein the second side of each link in the link assembly is connected to the first side of an adjacent link in the link assembly to form a row of links in each link assembly with the forward ends of each link cooperating to form the forward end of the link assembly and the rearward ends of each link cooperating to form the rearward end of each link assembly, one of the links being disposed adjacent the first side of the link assembly for forming a first end link and one of the links being disposed adjacent the second side of the link assembly for forming a second end link, the first side of the first end link forming the first side of the link assembly and the second side of the second end link forming the second side of the link assembly.

40. The conveyor belt of claim 39 wherein each of the link assemblies is defined further as comprising:

a first opening extending through the forward link end of the first end link between the forward end and rearward end thereof for defining a first link shaft end receiving slot.

41. The conveyor belt of claim 39 wherein each of the link assemblies is defined further as comprising:

a second opening extending through the forward link end of the second end link between the forward end and rearward end thereof for defining a second link shaft end receiving slot.

42. The conveyor belt of claim 39 wherein each of the link assemblies is defined further as being divided into a first end portion, a second end portion and a medial portion, the first end portion extending a predetermined distance from the first end of the link assembly towards the second end of the link assembly, the medial portion extending a predetermined distance from the first end portion towards the second end of the link assembly and the second end portion extending a predetermined distance from the medial portion to the second end of the link assembly, each of the links in the first and second end portions having a width less than the width of the links in the medial portion.

43. The conveyor belt of claim 42 wherein the links in the first and second end portions are substantially triangularly shaped and the links in the medial portion are substantially frustoconically shaped.

44. The conveyor belt of claim 42 wherein the medial portion of the link assembly has a first transitional link disposed immediately adjacent the first end portion, and a second transitional link disposed immediately adjacent the second end portion, each of the first and second transitional links having a width less than the width of the remaining links in the medial portion and greater than the width of the links in the first and second end portions.

45. The conveyor belt of claim 30 wherein each of the link shafts further comprise:

two elongated shaft segments, each of the shaft segments having a first end and a second end, the first end of one of the shaft segments forming the first end of the link shaft and the first end of the other shaft segment forming the second end of the link shaft.

46. The conveyor belt of claim 45 wherein each of the shaft segments has a tapered portion extending a predetermined distance from the first end towards the second end thereof, and a non-tapered portion extending a predetermined distance from the tapered portion to the second end thereof, the non-tapered portions of the shaft segments being engagable with a portion of the link assemblies such that the non-tapered portions of the shaft segments carry the tensile load between adjacent link assemblies as the link assemblies are travelling on a non-radial path, the tapered portions of the shaft segments being engagable with portions of the link assemblies such that the tapered portion of one of the shaft segments carries the tensile load between adjacent link assemblies as the link assemblies are travelling on a radial path.

47. The conveyor belt of claim 46 wherein the non-tapered portions of the shaft segments have a non-circular cross-section.

48. The conveyor belt of claim 30 wherein each of the links shafts is defined further as being a single member.

49. The conveyor belt of claim 48 wherein the link shafts have a tapered portion extending a predetermined distance from the first end towards the second end thereof, and a non-tapered portion extending a predetermined distance from the tapered portion to the second end thereof, the non-tapered portions of the link shafts being engagable with a portion of the link assemblies such that the non-tapered portions of the link shafts carry the tensile load between adjacent link assemblies as the link assemblies are travelling on a non-radial path, the tapered portions of the link shafts being engagable with portions of the link assemblies such that the tapered portions of the link shafts carry the tensile load between adjacent link assemblies as the link assemblies are travelling on a radial path.

50. The conveyor belt of claim 48 wherein the non-tapered portions of the link shafts have a non-circular cross-section.

51. The conveyor belt of claim 30 wherein each of the link assemblies further comprise a bottom surface having an indentation formed therein, the indentation extending between the first and second sides of the link assembly.

52. The conveyor belt of claim 30 further comprising:
a plurality of cap members, each cap member connected to one of the link assemblies so as to close off the forward shaft opening of the link assembly between the link shaft and one side of the link assembly whereby the link shaft is engageable with the cap member for preventing the link shaft from exiting from the link assembly.

53. The conveyor belt of claim 52 wherein two cap members are connected to each of the link assemblies such that one of the link shafts is interposed between the two cap members for retaining the one link shaft within the link assembly.

54. The conveyor belt of claim 30 further comprising:
a guide rail having a top side and a bottom side, the guide rail extending between the object receiving end of the conveyor belt and the object discharging end of the conveyor belt for guiding the conveyor belt along a predetermined conveyor path, the conveyor belt being disposed substantially adjacent the top side of the guide rail;
wherein each of a preselected group of the link assemblies further comprises:
a body member extending from the link assembly such that the body member is disposed adjacent the guide rail;
a roller bearing disposed between the body member and the guide rail to provide rolling engagement therebetween such that friction between the body member and the guide rail is substantially reduced.

55. The conveyor belt of claim 54 wherein each of the body members further comprises:
a retaining member extending from the body member such that the retaining member is disposed substantially adjacent the bottom side of the guide rail so as to prevent vertical movement of the conveyor belt relative to the guide rail as the conveyor belt travels along the predetermined conveyor path.

56. An endless conveyor belt having an object receiving end and an object discharging end, the object discharging end being laterally displaceable relative to the object receiving end, the conveyor belt comprising:
a plurality of link assemblies, each of the link assemblies having a forward end, a rearward end, a first side, a second side, a forward shaft opening extending through the forward end of each link assembly and a rearward shaft opening extending through the rearward end of each link assembly;
a plurality of link shafts for interconnecting adjacently disposed link assemblies such that the link assemblies are laterally movable relative to adjacently disposed link assemblies, one of the link shafts extending through the forward shaft opening of each of the link assemblies and through the rearward shaft openings of an adjacently disposed link assembly; and
wherein the link assemblies are constructed to permit the conveyor belt to turn unidirectionally with a turning ratio of less than 0.5.

57. The conveyor belt of claim 56 wherein each of the link assemblies further comprises mating forward and rearward surfaces, the forward surface of one link assembly being spaced a distance laterally from the rearward surface of an adjacent link assembly so as to permit lateral movement of one link assembly relative to the adjacent link assembly of at least 2°.

58. The conveyor belt of claim 56 wherein the conveyor belt has a first side, a second side, a width extending between the first and second sides of the conveyor belt, and a length extending between the object receiving end and the object discharging end of the conveyor belt, the object discharging end of the conveyor belt being displaced laterally from the object receiving end of the conveyor belt a distance greater than the width of the conveyor belt with each of the link assemblies being disposed in a substantially parallel relationship to each of the other link assemblies and the length and width of the conveyor belt having a ratio of less than about 10:1.

59. The conveyor belt of claim 56 wherein each pair of link assemblies is selectively collapsible and expandable in a longitudinal direction between a nested position wherein the forward surface of one link assembly is nested against the rearward surface of an adjacent link assembly, and an expanded position wherein the forward surface of one link assembly is spaced a distance longitudinally from the rearward surface of the adjacent link assembly, each pair of link assemblies being in the expanded position and each pair of link assemblies being disposed in a substantially parallel relationship to each of the other link assemblies when the pair of link assemblies are travelling on a straight path.

60. The conveyor belt of claim 59 wherein each pair of link assemblies is selectively collapsed to the nested position near one end of each link assembly and each pair of link assemblies is also selectively expanded to the expanded position near an opposite end of each link assembly when the pair of link assemblies is travelling on a radial path.

61. The conveyor belt of claim 60 wherein the conveyor belt further comprises:
locking means disposed on each link assembly for locking adjacent link assemblies together when the adjacent link assemblies are travelling on the radial path so as to prevent inboard friction between adjacent link assemblies and to maintain portions of each link assembly in the nested position.

62. The conveyor belt of claim 61 wherein the locking means further comprises:
a plurality of serrations formed on a portion of the forward and rearward surfaces of each link assembly near one of the first and second ends thereof, the serrations of one link assembly being configured to intermesh with the serrations of an adjacent link assembly when the link assemblies are in the nested positioned whereby the serrations lock adjacent link assemblies together when such adjacent link assemblies are turning on a radius.

63. The conveyor belt of claim 56 wherein the link assemblies are defined further as having a top surface, the top surface of each of the link assemblies cooperating with the top surfaces of the other link assemblies to provide the conveyor belt with a top surface, the top surfaces of the link assemblies having an arcuate configuration such that the top surface of the conveyor belt is provided with a scalloped configuration for prevent chordial chatter when the conveyor belt is travelling around a dead top.

64. The conveyor belt of claim 56 wherein each of the link assemblies further comprises:
a plurality of forward link ends spaced across the forward end of the link assembly, the forward link ends defining a plurality of forward link spaces therebetween such that the link assembly has a forward surface forming a contiguous row of alternating forward link ends and forward link spaces;
a plurality of rearward link ends spaced across the rearward end of the link assembly, the rearward link ends defining a plurality of rearward link spaces therebetween such that the link assembly has a rearward surface forming a contiguous row of alternating rearward link ends and rearward link spaces, each of the forward link spaces receiving a portion of one of the rearward link ends of an adjacent link assembly and each of the rearward link spaces of the adjacent link assembly receiving a portion of one of the forward link ends of the one link assembly.

65. The conveyor belt of claim 64 wherein each of the link assemblies further comprise:

a first shaft opening formed through the forward link ends, the first shaft openings being generally aligned and sized to receive one of the link shafts, the first shaft openings cooperating to form the forward shaft opening of the link assembly; and a second shaft opening formed through the rearward link ends, each second shaft opening being generally aligned and sized to receive one of the link shafts, the second shaft openings cooperating to form the rearward shaft opening of each of the link assemblies, the first and second shaft openings being generally oblong shaped such that the link assemblies are selectively movable in a longitudinal direction relative to adjacently disposed link assemblies.

66. The conveyor belt of claim 65 wherein each link assembly further comprises:

a plurality of links, each link having a first side, a second side, a closed forward end and an open rearward end defining one of the rearward link spaces, the forward end of each link forming one of the forward link ends of the link assembly and the first and second sides extending generally between the forward and rearward ends of each link; and the second side of each link in the link assembly is connected to the first side of an adjacent link in the link assembly to form a row of links in each link assembly with the forward ends of each link cooperating to form the forward end of the link assembly and the rearward ends of each link cooperating to form the rearward end of each link assembly, one of the links being disposed adjacent the first side of the link assembly for forming a first end link and one of the links being disposed adjacent the second side of the link assembly for forming a second end link, the first side of the first end link forming the first side of the link assembly and the second side of the second end link forming the second side of the link assembly.

67. The conveyor belt of claim 66 wherein each of the link assemblies is defined further as comprising:

a first opening extending through the forward link end of the first end link between the forward end and rearward end thereof for defining a first link shaft end receiving slot.

68. The conveyor belt of claim 66 wherein each of the link assemblies is defined further as comprising:

a second opening extending through the forward link end of the second end link between the forward end and rearward end thereof for defining a second link shaft end receiving slot.

69. The conveyor belt of claim 66 wherein each of the link assemblies is characterized as having a first end portion, a first medial portion, a second medial portion, and a second end portion, the first end portion extending a predetermined distance from the first end of the link assembly towards the second end of the link assembly, the first medial portion extending a predetermined distance from the first end portion towards the second end of the link assembly, the second medial portion extending a predetermined distance from the first medial portion towards the second end of the link assembly, and the second end portion extending a predetermined distance from the second medial portion to the second end of the link assembly, each of the links in the first and second end portions having a width less than the width of the links in the first and second medial portions.

70. The conveyor belt of claim 69 wherein each of the second shaft openings formed through the rearward link ends having a length, the length of the second shaft openings tapering upwardly from the first medial portion of the link assembly to the second end of the link assembly.

71. The conveyor belt of claim 69 wherein the links in the first and second end portions are substantially triangularly shaped and the links in the first and second medial portion are substantially frusto-conically shaped.

72. The conveyor belt of claim 69 wherein the first medial portion of the link assembly has a first transitional link disposed immediately adjacent the first end portion, and the second medial portion has a second transitional link disposed immediately adjacent the second end portion, each of the first and second transitional links having a width less than the width of the remaining links in the first and second medial portions and greater than the width of the links in the first and second end portions.

73. The conveyor belt of claim 56 wherein each of the link shafts further comprise:

two elongated shaft segments, each of the shaft segments having a first end and a second end, the first end of one of the shaft segments forming the first end of the link shaft and the first end of the other shaft segment forming the second end of the link shaft.

74. The conveyor belt of claim 73 wherein each of the shaft segments has a tapered portion extending a predetermined distance from the first end towards the second end thereof, and a non-tapered portion extending a predetermined distance from the tapered portion to the second end thereof, the non-tapered portions of the shaft segments being engagable with a portion of the link assemblies such that the non-tapered portions of the shaft segments carry the tensile load between adjacent link assemblies as the link assemblies are travelling on a non-radial path, the tapered portions of the shaft segments being engagable with portions of the link assemblies such that the tapered portion of one of the shaft segments carries the tensile load between adjacent link assemblies as the link assemblies are travelling on a radial path.

75. The conveyor belt of claim 74 wherein the non-tapered portions of the shaft segments have a non-circular cross-section.

76. The conveyor belt of claim 56 wherein each of the links shafts is defined further as being a single member.

77. The conveyor belt of claim 76 wherein the link shafts have a tapered portion extending a predetermined distance from the first end towards the second end thereof, and a non-tapered portion extending a predetermined distance from the tapered portion to the second end thereof, the non-tapered portions of the link shafts being engagable with a portion of the link assemblies such that the non-tapered portions of the link shafts carry the tensile load between adjacent link assemblies as the link assemblies are travelling on a non-radial path, the tapered portions of the link shafts being engageable with portions of the link assemblies such that the tapered portions of the link shafts carry the tensile load between adjacent link assemblies as the link assemblies are travelling on a radial path.

78. The conveyor belt of claim 76 wherein the non-tapered portions of the link shafts have a non-circular cross-section.

79. The conveyor belt of claim 76 wherein each of the link shafts are substantially free of an outwardly extending shaft head formed on at least one of the first and second ends thereof.

80. The conveyor belt of claim 56 wherein each of the link assemblies further comprise a bottom surface having an indentation formed therein, the indentation extending between the first and second sides of the link assembly.

81. The conveyor belt of claim 56 further comprising:
a plurality of cap members, each cap member connected to one of the link assemblies so as to close off the forward shaft opening of the link assembly between the link shaft and one side of the link assembly whereby the link shaft is engageable with the cap member for preventing the link shaft from exiting from the link assembly.

82. The conveyor belt of claim 81 wherein two cap members are connected to each of the link assemblies such that one of the link shafts is interposed between the two cap members for retaining the one link shaft within the link assembly.

83. The conveyor belt of claim 56 further comprising:
a guide rail having a top side and a bottom side, the guide rail extending between the object receiving end of the conveyor belt and the object discharging end of the conveyor belt for guiding the conveyor belt along a predetermined conveyor path, the conveyor belt being disposed substantially adjacent the top side of the guide rail;
wherein each of a preselected group of the link assemblies further comprises:
a body member extending from the link assembly such that the body member is disposed adjacent the guide rail;
a roller bearing disposed between the body member and the guide rail to provide rolling engagement therebetween such that friction between the body member and the guide rail is substantially reduced.

84. The conveyor belt of claim 83 wherein each of the body members further comprises:
a retaining member extending from the body member such that the retaining member is disposed substantially adjacent the bottom side of the guide rail so as to prevent vertical movement of the conveyor belt relative to the guide rail as the conveyor belt travels along the predetermined conveyor path.

85. A conveyor belt having an object receiving end and an object discharging end, the object discharging end being laterally displaceable relative to the object receiving end, the conveyor belt comprising:
a plurality of link assemblies, each of the link assemblies having a forward end, a rearward end, a first side, a second side, a forward surface and a rearward surface configured to mate with the forward surface, a forward shaft opening extending through the forward end of each link assembly and a rearward shaft opening extending through the rearward end of each link assembly;
a plurality of link shafts for interconnecting adjacently disposed link assemblies such that the link assemblies are laterally movable relative to adjacently disposed link assemblies, one of the link shafts extending through the forward shaft opening of each of the link assemblies and through the rearward shaft openings of an adjacently disposed link assembly, each link shaft having a first end disposed inwardly a distance from the first side of each of the link assemblies, and a second end disposed inwardly a distance from the second side of each of the link assemblies;
wherein the forward surface of one link assembly is spaced a distance laterally from the rearward surface of an adjacently disposed link assembly so as to permit lateral movement of one link assembly relative to the adjacently disposed link assembly of at least 20;
locking means disposed on each link assembly for locking adjacent link assemblies together when the adjacent link assemblies are travelling on the radial path so as to prevent inboard friction between adjacent link assemblies and to maintain portions of each link assembly in the nested position, the locking means further comprising:
a plurality of serrations formed on a portion of the forward and rearward surfaces of each link assembly near the first and second ends thereof, the serrations of one link assembly being configured to intermesh with the serrations of an adjacent link assembly when the link assemblies are in the nested positioned whereby the serrations lock adjacent link assemblies together when such adjacent link assemblies are turning on a radius.

86. A conveyor belt having an object receiving end and an object discharging end, the conveyor belt having a first side, a second side, a width extending between the first and second sides of the conveyor belt, and a length extending between the object receiving end and the object discharging end of the conveyor belt, the conveyor belt comprising:
a plurality of link assemblies, each of the link assemblies having a forward end, a rearward end, a first side, a second side, a forward surface and a rearward surface configured to mate with the forward surface, a forward shaft opening extending through the forward end of each link assembly and a rearward shaft opening extending through the rearward end of each link assembly;
a plurality of link shafts for interconnecting adjacently disposed link assemblies such that the link assemblies are laterally movable relative to adjacently disposed link assemblies, one of the link shafts extending through the forward shaft opening of each of the link assemblies and through the rearward shaft openings of an adjacently disposed link assembly;
wherein the forward surface of one link assembly is spaced a distance laterally from the rearward surface of an adjacently disposed link assembly so as to permit lateral movement of one link assembly relative to the adjacently disposed link assembly of at least 2° while the adjacently disposed link assemblies are maintained in a substantially parallel relationship, the object discharging end of the conveyor belt being displaced laterally from the object receiving end of the conveyor belt a distance greater than the width of the conveyor belt with each of the link assemblies being disposed in a substantially parallel relationship to each of the other link assemblies and the length and width of the conveyor belt having a ratio of less than about 10:1.

87. A conveyor belt having an object receiving end and an object discharging end, comprising:
a plurality of link assemblies, each of the link assemblies having a forward end, a rearward end, a first side, a second side, a forward surface and a rearward surface configured to mate with the forward surface, a forward shaft opening extending through the forward end of each link assembly and a rearward shaft opening extending through the rearward end of each link assembly;

a plurality of link shafts for interconnecting adjacently disposed link assemblies such that the link assemblies are laterally movable relative to adjacently disposed link assemblies, one of the link shafts extending through the forward shaft opening of each of the link assemblies and through the rearward shaft openings of an adjacently disposed link assembly;

locking means disposed on each link assembly for locking adjacent link assemblies together when the adjacent link assemblies are traveling on the radial path so as to prevent inboard friction between adjacent link assemblies and to maintain portions of each link assembly in the nested position, the locking means further comprising a plurality of serrations formed on a portion of the forward and rearward surfaces of each link assembly near the first and second ends thereof, the serrations of one link assembly being configured to intermesh with the serrations of an adjacent link assembly when the link assemblies are in the nested positioned whereby the serrations lock adjacent link assemblies together when such adjacent link assemblies are turning on a radius; and wherein the forward surface of one link assembly is spaced a distance laterally from the rearward surface of an adjacently disposed link assembly so as to permit lateral movement of one link assembly relative to the adjacently disposed link assembly of at least 2° while the adjacently disposed link assemblies are maintained in a substantially parallel relationship.

88. A conveyor belt having an object receiving end and an object discharging end, comprising:

a plurality of link assemblies, each of the link assemblies having a forward end, a rearward end, a first side, a second side, a forward surface and a rearward surface configured to mate with the forward surface, a forward shaft opening extending through the forward end of each link assembly and a rearward shaft opening extending through the rearward end of each link assembly, each of the link assemblies including a plurality of links, each link having a first side, a second side, a closed forward end and an open rearward end defining one of the rearward link spaces, the forward end of each link forming one of the forward link ends of the link assembly and the first and second sides extending generally between the forward and rearward ends of each link, each of the link assemblies being defined further as being divided into a first end portion, a second end portion and a medial portion, the first end portion extending a predetermined distance from the first end of the link assembly towards the second end of the link assembly, the medial portion extending a predetermined distance from the first end portion towards the second end of the link assembly and the second end portion extending a predetermined distance from the medial portion to the second end of the link assembly, the second side of each link in the link assembly being connected to the first side of an adjacent link in the link assembly to form a row of links in each link assembly with the forward ends of each link cooperating to form the forward end of the link assembly and the rearward ends of each link cooperating to form the rearward end of each link assembly, one of the links being disposed adjacent the first side of the link assembly for forming a first end link and one of the links being disposed adjacent the second side of the link assembly for forming a second end link, the first side of the first end link forming the first side of the link assembly and the second side of the second end link forming the second side of the link assembly, each of the links in the first and second end portions having a width less than the width of the links in the medial portion, the links in the first and second end portions being substantially triangularly shaped and the links in the medial portion being substantially frusto-conically shaped;

a plurality of link shafts for interconnecting adjacently disposed link assemblies such that the link assemblies are laterally movable relative to adjacently disposed link assemblies, one of the link shafts extending through the forward shaft opening of each of the link assemblies and through the rearward shaft openings of an adjacently disposed link assembly;

wherein the forward surface of one link assembly is spaced a distance laterally from the rearward surface of an adjacently disposed link assembly so as to permit lateral movement of one link assembly relative to the adjacently disposed link assembly of at least 2° while the adjacently disposed link assemblies are maintained in a substantially parallel relationship.

* * * * *

UNITED STATES PATENT AND TRADEMARK OFFICE
CERTIFICATE OF CORRECTION

PATENT NO. : 5,906,270

DATED : May 25, 1999

INVENTOR(S) : William G. Faulkner

It is certified that error appears in the above-identified patent and that said Letters Patent is hereby corrected as shown below:

In the Drawings:

Fig. 1: Please insert the numeral --24-- to designate the forward shaft opening.

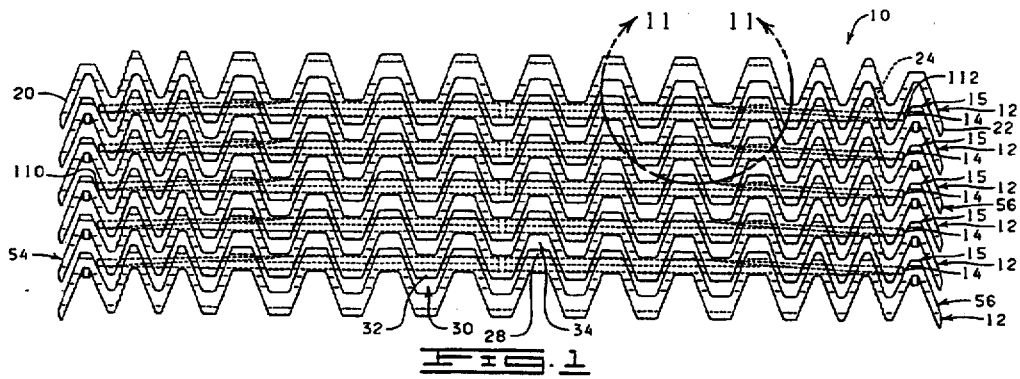

UNITED STATES PATENT AND TRADEMARK OFFICE
CERTIFICATE OF CORRECTION

PATENT NO. : 5,906,270

DATED : May 25, 1999

INVENTOR(S) : William G. Faulkner

It is certified that error appears in the above-identified patent and that said Letters Patent is hereby corrected as shown below:

Fig. 3: Please delete the reference numeral "11" and substitute therefor -- 12 -- (to designate link end); Please insert -- 28 -- and its leadline to indicate the link end, and Please insert reference numerals -- 32 -- and their leadlines to designate the rearward link ends

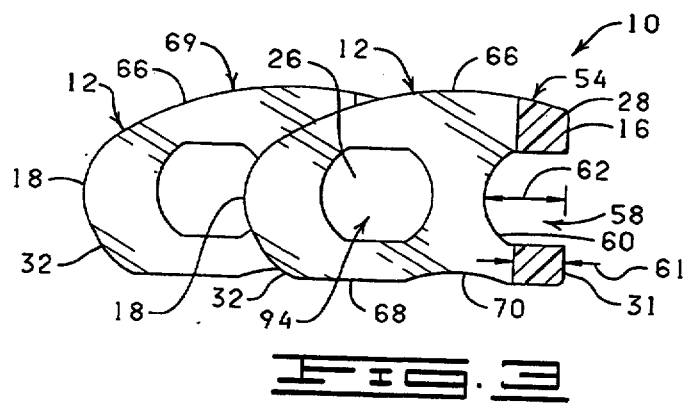

FIG. 3

UNITED STATES PATENT AND TRADEMARK OFFICE
CERTIFICATE OF CORRECTION

Page 3 of 18

PATENT NO. : 5,906,270

DATED : May 25, 1999

INVENTOR(S) : William G. Faulkner

It is certified that error appears in the above-identified patent and that said Letters Patent is hereby corrected as shown below:

Fig. 4: Please insert reference numeral -- 28 -- and its leadline to indicate the link end and Please insert reference numeral -- 32 -- and its leadline to designate the rearward link end

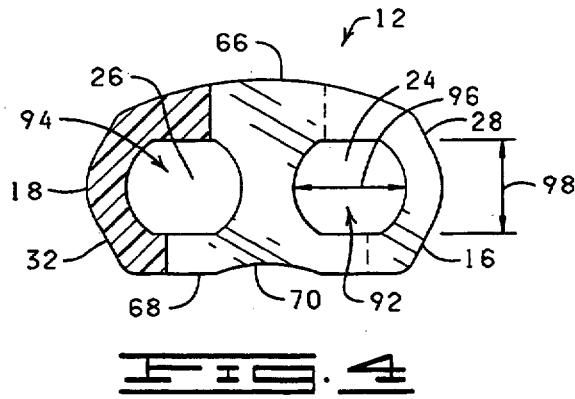

UNITED STATES PATENT AND TRADEMARK OFFICE
CERTIFICATE OF CORRECTION

PATENT NO.    :    5,906,270

DATED    :    May 25, 1999

INVENTOR(S)    :    William G. Faulkner

It is certified that error appears in the above-identified patent and that said Letters Patent is hereby corrected as shown below:

Fig. 18:   Please delete reference numeral "230" and substitute therefor -- 230a -- to designate the hold down assembly; and Please insert reference numeral -- 236a -- and its leadline to designate the roller bearing.

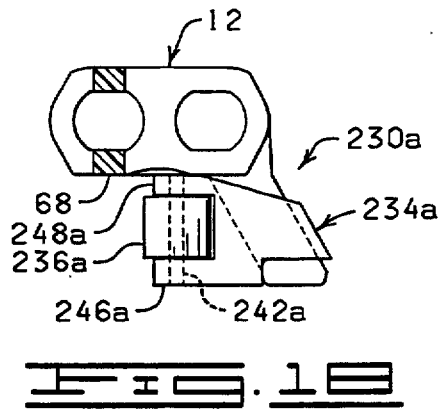

UNITED STATES PATENT AND TRADEMARK OFFICE
CERTIFICATE OF CORRECTION

Page 5 of 18

PATENT NO. : 5,906,270

DATED : May 25, 1999

INVENTOR(S) : William G. Faulkner

It is certified that error appears in the above-identified patent and that said Letters Patent is hereby corrected as shown below:

Fig. 19: Please insert reference numeral -- 342 -- and its leadline to designate the second side.

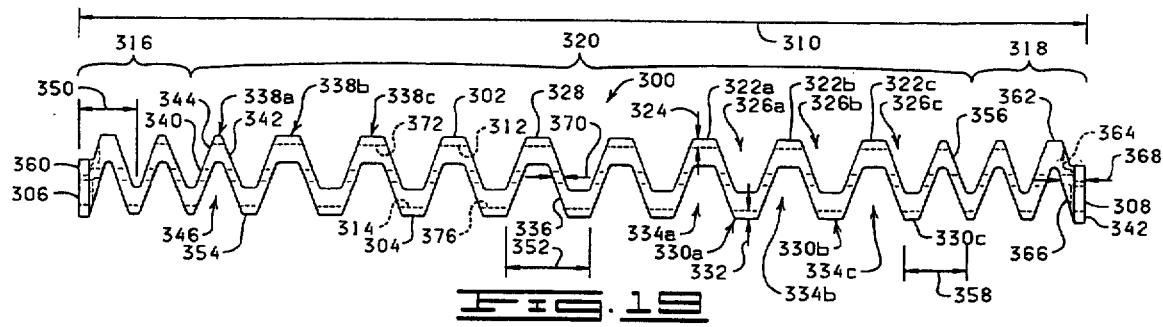

UNITED STATES PATENT AND TRADEMARK OFFICE
CERTIFICATE OF CORRECTION

Page 6 of 18

PATENT NO.    :    5,906,270

DATED    :    May 25, 1999

INVENTOR(S)    :    William G. Faulkner

It is certified that error appears in the above-identified patent and that said Letters Patent is hereby corrected as shown below:

Fig. 20:  Please insert reference numeral -- 342 -- and its leadline to designate the second side; and Please change the leadline for reference numeral "362" to properly designate the second end link.

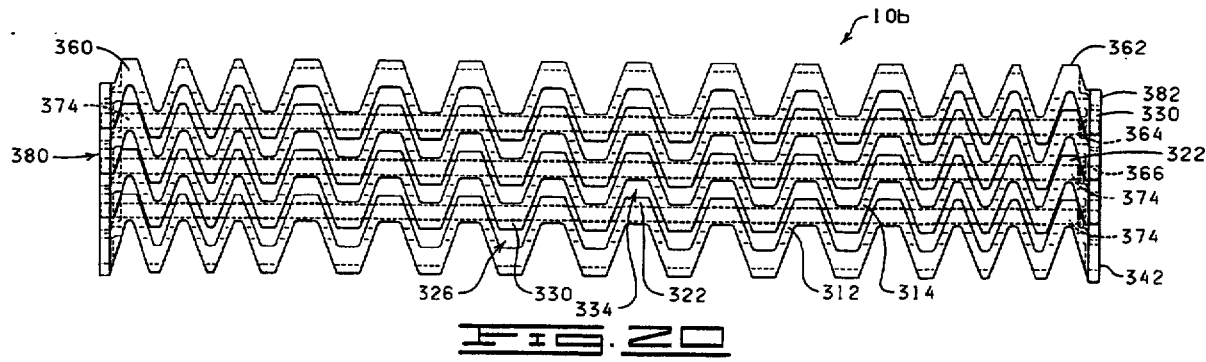

UNITED STATES PATENT AND TRADEMARK OFFICE
CERTIFICATE OF CORRECTION

PATENT NO. : 5,906,270

DATED : May 25, 1999

INVENTOR(S) : William G. Faulkner

It is certified that error appears in the above-identified patent and that said Letters Patent is hereby corrected as shown below:

Fig. 22: Please delete reference numeral "532c" and its leadline.

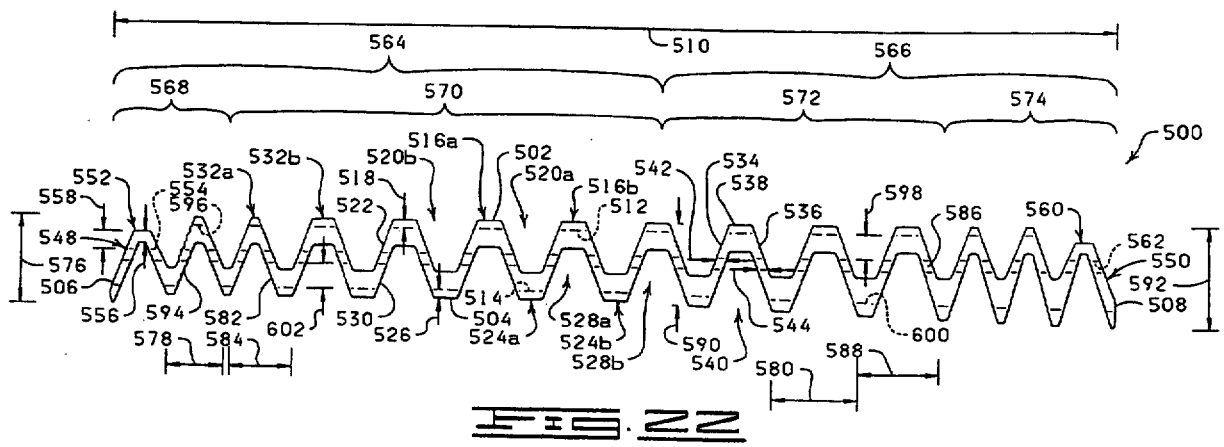

UNITED STATES PATENT AND TRADEMARK OFFICE
CERTIFICATE OF CORRECTION

PATENT NO. : 5,906,270

DATED : May 25, 1999

INVENTOR(S) : William G. Faulkner

It is certified that error appears in the above-identified patent and that said Letters Patent is hereby corrected as shown below:

Col. 1: line 20, delete "problem" and substitute -- problem, -- therefor.

line 20, delete "for example" and substitute -- for example, -- therefor.

line 23, delete "outer most" and substitute -- outermost -- therefor.

lines 24-25, delete "outer most" and substitute -- outermost -- therefor.

line 30, delete "limit" and substitute -- limit, -- therefor.

line 31, delete "course" and substitute -- course, -- therefor.

Col. 2: line 67, delete "13" and substitute -- 12 -- therefor.

Col. 3: line 21, delete "1 and 2)" and substitute -- 1, 2 and 12) -- therefor.

line 24, delete "references" and substitute -- reference -- therefor.

line 32, delete "references" and substitute -- reference -- therefor.

line 37, delete "references" and substitute -- reference -- therefor.

line 57, delete "are" and substitute -- is -- therefor.

line 59, delete "are" and substitute -- is -- therefor.

UNITED STATES PATENT AND TRADEMARK OFFICE
CERTIFICATE OF CORRECTION

PATENT NO.    :   5,906,270
DATED         :   May 25, 1999
INVENTOR(S)   :   William G. Faulkner It is certified that error appears in the above-identified patent and that said Letters Patent is hereby corrected as shown below:

Col. 4:   line 1, delete "ends" and substitute -- end -- therefor.

line 1, delete "cooperate" and substitute -- cooperates -- therefor.

line 3, delete "ends" and substitute -- end -- therefor.

line 3, delete "cooperate" and substitute -- cooperates -- therefor.

line 33, delete ("FIGS. 2)" and substitute -- (FIG. 2). -- therefor.

Col. 6:   line 40, delete "7)" and substitute -- 6) -- therefor.

Col. 9:   line 26, delete "FIG." and substitute -- FIGS. 11 and -- therefor.

line 36, delete "is" and substitute -- are -- therefor.

Col. 10:  line 11, after "180", insert -- (FIG. 10) -- .

line 17, after "96", insert -- (FIG. 4) -- .

line 41, after "10" insert -- (FIG.13) -- .

line 55, after "42", insert -- (FIG. 2) -- .

UNITED STATES PATENT AND TRADEMARK OFFICE
CERTIFICATE OF CORRECTION

PATENT NO.    :    5,906,270
DATED         :    May 25, 1999
INVENTOR(S)   :    William G. Faulkner It is certified that error appears in the above-identified patent and that said Letters Patent is hereby corrected as shown below:

Col. 11:  line 36, delete desirable" and substitute -- desirably -- therefor.

line 39, delete "are" and substitute -- is -- therefor.

Col. 12:  line 14, after "232", insert -- (shown in phantom in FIG. 16) --.

Line 46, delete "240" and substitute -- 238 -- therefor.

Col. 14:  line 65, delete "lob" and substitute -- 10b -- therefor.

Col. 15:  line 27, after "side", insert -- 382 -- .

line 40, delete "396" and substitute -- 398 -- therefor.

Col. 16:  line 46, delete "are" and substitute -- is -- therefor.

line 48, delete "are" and substitute -- is -- therefor.

Col 17:   line 36, after "herein" and before the "." insert -- (see, FIG.24) -- .

line 65, delete "have" and substitute -- has -- therefor.

UNITED STATES PATENT AND TRADEMARK OFFICE
CERTIFICATE OF CORRECTION

PATENT NO. : 5,906,270
DATED : May 25, 1999
INVENTOR(S) : William G. Faulkner

It is certified that error appears in the above-identified patent and that said Letters Patent is hereby corrected as shown below:

Col. 18: line 27, delete "are" and substitute -- is -- therefor.

Col. 20: line 24, delete "allow" and substitute -- allows -- therefor.

line 33, delete "become" and substitute -- becomes -- therefor.

UNITED STATES PATENT AND TRADEMARK OFFICE
CERTIFICATE OF CORRECTION

| | | |
|---|---|---|
| PATENT NO. | : | 5,906,270 |
| DATED | : | May 25, 1999 |
| INVENTOR(S) | : | William G. Faulkner |

It is certified that error appears in the above-identified patent and that said Letters Patent is hereby corrected as shown below:

In the Claims:

5. The conveyor belt of claim 2, wherein [each pair of] the link assemblies [is] are selectively collapsible and expandable in a longitudinal direction between a nested position wherein the forward surface of one link assembly is nested against the rearward surface of an adjacent link assembly, and an expanded position wherein the forward surface of one link assembly is spaced a distance longitudinally from the rearward surface of the adjacent link assembly, [each pair of] the adjacently disposed link assemblies being in the expanded position and [each pair of link assemblies] being disposed in a substantially parallel relationship to each of the other link assemblies when the [pair of] adjacently disposed link assemblies are travelling on a straight path.

UNITED STATES PATENT AND TRADEMARK OFFICE
CERTIFICATE OF CORRECTION

PATENT NO. : 5,906,270

DATED : May 25, 1999

INVENTOR(S) : William G. Faulkner

It is certified that error appears in the above-identified patent and that said Letters Patent is hereby corrected as shown below:

6. The conveyor belt of claim 5, wherein [each pair of] the adjacently disposed link assemblies [is] are selectively collapsed to the nested position near [one end] the first side of each link assembly and [each pair of] the adjacently disposed link assemblies [is] are also selectively expanded to the expanded position near [an opposite end] the second side of each link assembly when [the pair of] the adjacently disposed link assemblies [is] are travelling on a radial path.

Claim 8, line 5 (Col. 22, line 38), delete "ends" and substitute --sides-- therefor.

Claim 9, line 7 (Col. 22, line 51), delete "for" and substitute --to-- therefor.

Claim 11, line 2 (Col. 23, line 11), delete "comprise:" and substitute --comprises:-- therefor.

Claim 18, line 2 (Col. 24, line 21), delete "comprise:" and substitute --comprises:-- therefor.

Claim 21, line 1 (Col. 24, line 47), delete "links" and substitute --link-- therefor.

Claim 23, line 1 (Col. 24, line 65), delete "21" and substitute --22-- therefor.

Claim 24, line 2, delete "comprise" and substitute --comprises-- therefor.

UNITED STATES PATENT AND TRADEMARK OFFICE
CERTIFICATE OF CORRECTION

PATENT NO. : 5,906,270
DATED : May 25, 1999
INVENTOR(S) : William G. Faulkner

It is certified that error appears in the above-identified patent and that said Letters Patent is hereby corrected as shown below:

32. The conveyor belt of claim 30, wherein [each pair of] the adjacently disposed link assemblies [is] are selectively collapsible and expandable in a longitudinal direction between a nested position wherein the forward surface of one link assembly is nested against the rearward surface of an adjacent link assembly, and an expanded position wherein the forward surface of one link assembly is spaced a distance longitudinally from the rearward surface of the adjacent link assembly, [each pair of] the adjacently disposed link assemblies being in the expanded position and [each pair of] the adjacently disposed link assemblies being disposed in a substantially parallel relationship to each of the other link assemblies when the [pair of] adjacently disposed link assemblies are travelling on a straight path.

33. (amended) The conveyor belt of claim 30, wherein [each pair of] the adjacently disposed link assemblies [is] are selectively collapsed to the nested position near [one end] the first side of each link assembly and [each pair of] the adjacently disposed link assemblies [is] are also selectively expanded to the expanded position near [an opposite end] the second side of each link assembly when the [pair of] adjacently disposed link assemblies [is] are travelling on a radial path.

UNITED STATES PATENT AND TRADEMARK OFFICE
CERTIFICATE OF CORRECTION

PATENT NO.    :   5,906,270

DATED         :   May 25, 1999

INVENTOR(S)   :   William G. Faulkner

It is certified that error appears in the above-identified patent and that said Letters Patent is hereby corrected as shown below:

Claim 35, line 5 (Col. 26, line 47), delete "ends" and substitute --sides-- therefor.

Claim 36, line 8 (Col. 26, line 60), delete "for" and substitute --to-- therefor.

Claim 38, line 2 (Col. 27, line 15), delete "comprise:" and substitute --comprises:-- therefor.

Claim 45, line 2 (Col. 28, line 23), delete "comprise:" and substitute --comprises:-- therefor.

Claim 48, line 2 (Col. 28, line 48), delete "links" and substitute --link-- therefor.

Claim 50, line 1 (Col. 28, line 63), delete "48" and substitute --49-- therefor.

Claim 51, line 2 (Col. 28, line 67), delete "comprise" and substitute --comprises-- therefor.

Claim 54, line 13 (Col. 29, line 28), after "rail;", insert --and--.

UNITED STATES PATENT AND TRADEMARK OFFICE
CERTIFICATE OF CORRECTION

PATENT NO. : 5,906,270
DATED : May 25, 1999
INVENTOR(S) : William G. Faulkner

It is certified that error appears in the above-identified patent and that said Letters Patent is hereby corrected as shown below:

59. The conveyor belt of claim 56, wherein [each pair of] the adjacently disposed link assemblies [is] are selectively collapsible and expandable in a longitudinal direction between a nested position wherein the forward surface of one link assembly is nested against the rearward surface of an adjacent link assembly, and an expanded position wherein the forward surface of one link assembly is spaced a distance longitudinally from the rearward surface of the adjacent link assembly, [each pair of] the adjacently disposed link assemblies being in the expanded position and [each pair of] the adjacently disposed link assemblies being disposed in a substantially parallel relationship to each of the other link assemblies when the [pair of] adjacently disposed link assemblies are travelling on a straight path.

60. The conveyor belt of claim 59, wherein [each pair of] the adjacently disposed link assemblies [is] are selectively collapsed to the nested position near [one end] the first side of each link assembly and [each pair of] the adjacently disposed link assemblies [is] are also selectively expanded to the expanded position near [an opposite end] the second side of each link assembly when the [pair of] adjacently disposed link assemblies [is] are travelling on a radial path.

UNITED STATES PATENT AND TRADEMARK OFFICE
CERTIFICATE OF CORRECTION

PATENT NO.     :  5,906,270
DATED          :  May 25, 1999
INVENTOR(S)    :  William G. Faulkner It is certified that error appears in the above-identified patent and that said Letters Patent is hereby corrected as shown below:

Claim 62, line 5 (Col. 30, line 42), delete "ends" and substitute --sides-- therefor.

Claim 63, line 7 (Col. 30, line 56), delete "for" and substitute --to-- therefor.

Claim 65, line 2 (Col. 31, line 11), delete "comprise:" and substitute --comprises:-- therefor.

Claim 73, line 2 (Col. 32, line 28), delete "comprise:" and substitute --comprises:-- therefor.

Claim 76, line 1 (Col. 32, line 53), delete "links" and substitute --link-- therefor.

Claim 78, line 1 (Col. 33, line 1), delete "76" and substitute --77-- therefor.

Claim 79, line 2 (Col. 33, line 5), delete "are" and substitute --is-- therefor.

Claim 80, line 2 (Col. 33, line 9), delete "comprise" and substitute --comprises-- therefor.

Claim 83, line 13 (Col. 33, line 38), after "rail;", insert --and--.

UNITED STATES PATENT AND TRADEMARK OFFICE
CERTIFICATE OF CORRECTION

Page 18 of 18

PATENT NO. : 5,906,270
DATED : May 25, 1999
INVENTOR(S) : William G. Faulkner

It is certified that error appears in the above-identified patent and that said Letters Patent is hereby corrected as shown below:

Claim 85, line 28 (Col. 34, line 11), delete "20;" and substitute --2°-- therefor.

Claim 92, line 35 ( Col. 36, line 40), after "assembly;", insert --and--.

Signed and Sealed this

Eighth Day of August, 2000

Attest:

Q. TODD DICKINSON

Attesting Officer

Director of Patents and Trademarks